United States Patent
Watanabe

(10) Patent No.: US 8,289,823 B2
(45) Date of Patent: Oct. 16, 2012

(54) RECORDING APPARATUS, RECORDING METHOD, RECORDING MEDIUM, REPRODUCING APPARATUS AND REPRODUCING METHOD

(75) Inventor: Akinobu Watanabe, Kawasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/089,484

(22) Filed: Apr. 19, 2011

(65) Prior Publication Data
US 2012/0075969 A1   Mar. 29, 2012

(30) Foreign Application Priority Data
Sep. 29, 2010   (JP) ................. 2010-218087

(51) Int. Cl.
*G11B 7/00*   (2006.01)
(52) U.S. Cl. ............ 369/30.08; 369/94; 369/47.15; 386/248
(58) Field of Classification Search .......... 369/30.08, 369/94, 47.15, 59.25, 275.3; 386/248, 246
See application file for complete search history.

(56) References Cited

U.S. PATENT DOCUMENTS

| | | | |
|---|---|---|---|
| 2005/0122853 A1* | 6/2005 | Seo et al. ............ | 369/30.08 |
| 2005/0201718 A1* | 9/2005 | Kato .................... | 386/46 |
| 2006/0077873 A1* | 4/2006 | Seo et al. ............ | 369/275.3 |
| 2007/0230917 A1* | 10/2007 | Okada et al. ........ | 386/95 |
| 2009/0003172 A1* | 1/2009 | Yahata et al. ....... | 369/53.41 |
| 2010/0067336 A1 | 3/2010 | Oono et al. | |
| 2010/0149938 A1* | 6/2010 | Takashima et al. .. | 369/47.15 |

FOREIGN PATENT DOCUMENTS
JP    2003168591   6/2003
WO   WO2007037162   4/2007
* cited by examiner

*Primary Examiner* — Thang Tran
(74) *Attorney, Agent, or Firm* — Antonelli, Terry, Stout & Kraus, LLP.

(57) ABSTRACT

The present invention relates to a recording/reproducing method, a recording/reproducing apparatus and a recording medium. In the conventional art, there is no method of distinguishing a program recorded on an RE layer by an application on a ROM layer, from a program recorded on the RE layer by a user, on a hybrid disc. The present invention solves a problem as described above by separating a playlist for recording performed by the application on the ROM layer, from a playlist for recording performed by the user, and retaining information indicating a subject which has performed the recording.

5 Claims, 28 Drawing Sheets

FIG. 2

| | |
|---|---|
| CLASS | ~201 |
| VERSION NUMBER | ~202 |
| PLAYLIST INFORMATION START ADDRESS | ~203 |
| PLAYLIST MARK INFORMATION START ADDRESS | ~204 |
| PROPRIETARY DATA START ADDRESS | ~205 |
| USER INTERFACE APPLICATION INFORMATION | ~206 |
| PLAYLIST INFORMATION | ~207 |
| PLAYLIST MARK INFORMATION | ~208 |
| PROPRIETARY DATA | ~209 |

FIG. 3

| | |
|---|---|
| LENGTH | ～301 |
| HYBRID FLAG | ～321 |
| CHARACTER CODE | ～302 |
| REPRODUCTION PROTECTION FLAG | ～303 |
| RECORDING PROTECTION FLAG | ～304 |
| REPRODUCED FLAG | ～305 |
| EDITED FLAG | ～306 |
| TIME ZONE | ～307 |
| DATE AND TIME OF RECORDING | ～308 |
| PLAYLIST LENGTH | ～309 |
| MANUFACTURER ID | ～310 |
| MODEL CODE | ～311 |
| CHANNEL NUMBER | ～312 |
| CHANNEL NAME LENGTH | ～313 |
| CHANNEL NAME | ～314 |
| PLAYLIST NAME LENGTH | ～315 |
| PLAYLIST NAME | ～316 |
| LENGTH OF DETAILS OF PLAYLIST | ～317 |
| DETAILS OF PLAYLIST | ～318 |

FIG. 4

| | |
|---|---|
| PADDING | ~401 |
| DAYLIGHT SAVING TIME FLAG | ~402 |
| TIME ZONE SIGN | ~403 |
| TIME ZONE VALUE | ~404 |
| 30-MINUTE FLAG | ~405 |

FIG. 5

| | |
|---|---|
| LENGTH | ~501 |
| PLAYLIST CPI CLASS | ~502 |
| NUMBER OF PLAYITEMS | ~503 |
| NUMBER OF SUB PLAYITEMS | ~504 |
| PLAYITEM | ~505 |
| SUB PLAYITEM | ~506 |

FIG. 6

| | |
|---|---|
| LENGTH | ~601 |
| CLIP INFORMATION FILE NAME | ~602 |
| CLIP CODEC INFORMATION | ~603 |
| CONNECTION CONDITION | ~604 |
| STC INFORMATION | ~605 |
| IN TIME | ~606 |
| OUT TIME | ~607 |
| BRIDGE SEQUENCE INFORMATION | ~608 |

FIG. 7

| | |
|---|---|
| BRIDGE SEQUENCE INFORMATION FILE NAME | ~701 |
| CLIP CODEC INFORMATION | ~702 |

FIG. 8

| | |
|---|---|
| LENGTH | ~801 |
| CLIP INFORMATION FILE NAME | ~802 |
| CLIP CODEC INFORMATION | ~803 |
| SUB PLAYITEM CLASS | ~804 |
| STC ID | ~805 |
| SUB PLAYITEM IN TIME | ~806 |
| SUB PLAYITEM OUT TIME | ~807 |
| SYNCHRONIZED PLAYITEM ID | ~808 |
| SYNCHRONIZED PLAYITEM START PTS | ~809 |

FIG. 36

| | |
|---|---|
| CLASS | ~3601 |
| HYBRID FLAG | ~3602 |
| VERSION NUMBER | ~3603 |
| PLAYLIST TABLE START ADDRESS | ~3604 |
| PROPRIETARY DATA START ADDRESS | ~3605 |
| GENERAL INFORMATION | ~3606 |
| PLAYLIST TABLE | ~3607 |
| PROPRIETARY DATA | ~3608 |

FIG. 37

| | |
|---|---|
| LENGTH | ~3701 |
| MANUFACTURER ID | ~3702 |
| MODEL CODE | ~3703 |
| PROPRIETARY DATA START ADDRESS | ~3704 |
| PROPRIETARY DATA LENGTH | ~3705 |
| PROPRIETARY DATA BODY | ~3706 |

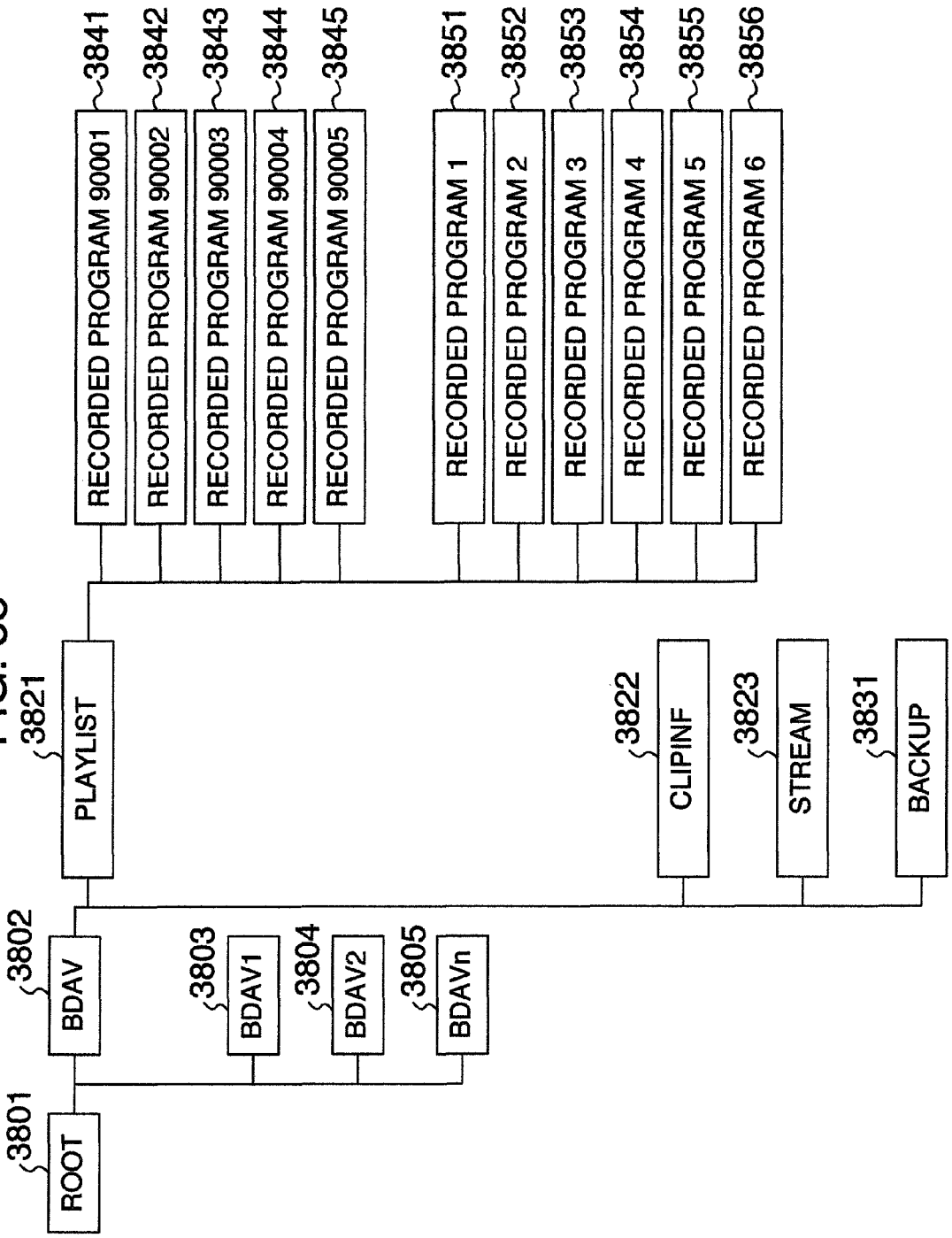

RECORDING APPARATUS, RECORDING METHOD, RECORDING MEDIUM, REPRODUCING APPARATUS AND REPRODUCING METHOD

INCORPORATION BY REFERENCE

The present application claims priority from Japanese application JP2010-218087 filed on Sep. 29, 2010, the content of which is hereby incorporated by reference into this application.

BACKGROUND OF THE INVENTION

1. Field of the Invention

The present invention relates to a recording apparatus, a recording method, a recording medium, a reproducing apparatus and a reproducing method.

2. Description of the Related Art

As optical discs, there are proposed a hybrid disc including a combination of a CD and a DVD, and a hybrid disc including a combination of a reproduction-only layer and a recording layer, such as a combination of a DVD-ROM and a DVD-RW, in one medium.

SUMMARY OF THE INVENTION

JP-A-2003-168591 proposes a method of reproducing content (particularly, still images and audio) recorded on an optical disc, and a method of managing data such as a playlist on the optical disc.

WO07/037162 (corresponding to U.S. Patent Publication No. 2010/0067336) proposes a method of setting a layer to be preferentially reproduced on a hybrid disc including a reproduction-only layer and a recording layer.

In the conventional art, there is a case where a user records data on the recording layer of the hybrid disc through a recorder, and in addition, application software included on the reproduction-only layer records data on the recording layer, and thereby, multiple kinds of recorded data are mixed on the recording layer. In that case, a change such as deletion or editing may be added to a recorded program by another subject different from a subject (in this case, the user or the application software) which has recorded the program, and the recorded program may transit to a state which is not supposed by the recording subject. However, this problem is not considered in the conventional art.

The present invention solves the above described problem by creating respective playlists for managing program data to be recorded, with different file names, and retaining information indicating which recording subject has performed the recording in which folder, in the playlist files.

According to a recording method of the present invention, since recorded program data is not altered by another subject other than the subject which has performed the recording, there is an effect that multiple ROM-layer applications can be stored on one hybrid disc. Furthermore, there is an effect that the user can use the recorder to record a program on the hybrid disc on which the ROM-layer application has been stored. Furthermore, there is an effect of preventing unintended alteration in which the ROM-layer application freely deletes or edits the program recorded by the user through the recorder. Furthermore, there is an effect of preventing unintended alteration in which the user freely deletes or edits a program recorded by the ROM-layer application. Furthermore, there is an effect of enabling multiple users to record the programs so as to be mixed on one hybrid disc.

Moreover, according to a reproducing method of the present invention, there is an effect that even if multiple pieces of ROM-layer application software have performed the recording on one hybrid disc, only programs recorded by an application which has been started can be displayed in a list and reproduced. Furthermore, there is an effect that even if the programs recorded by the user are included on the hybrid disc on which the ROM-layer application has been stored, only the programs recorded by the user can be displayed in a list and reproduced. Furthermore, since only a reproduction operation is accepted as the user's operation for the program recorded by the ROM-layer application, there is an effect that the user can reproduce the program recorded by the ROM-layer application, and such a problem is prevented that the user may mistakenly delete the program recorded by the ROM-layer application.

Other objects, features and advantages of the invention will become apparent from the following description of the embodiments of the invention taken in conjunction with the accompanying drawings.

BRIEF DESCRIPTION OF THE DRAWING

FIG. 2 is a schematic diagram showing a structure of a playlist file;

FIG. 3 is a schematic diagram showing a structure of user interface application information;

FIG. 4 is a schematic diagram showing a structure of a time zone;

FIG. 5 is a schematic diagram showing a structure of playlist information;

FIG. 6 is a schematic diagram showing a structure of a playitem;

FIG. 7 is a schematic diagram showing a structure of bridge sequence information;

FIG. 8 is a schematic diagram showing a structure of a sub playitem;

FIG. 36 is a schematic diagram showing a structure of an info.bdav file;

FIG. 37 is a schematic diagram showing a structure of proprietary data; and

FIG. 38 is a schematic diagram of the directory structure and the file structure.

DESCRIPTION OF THE REFERENCE NUMERALS

Figure 1:
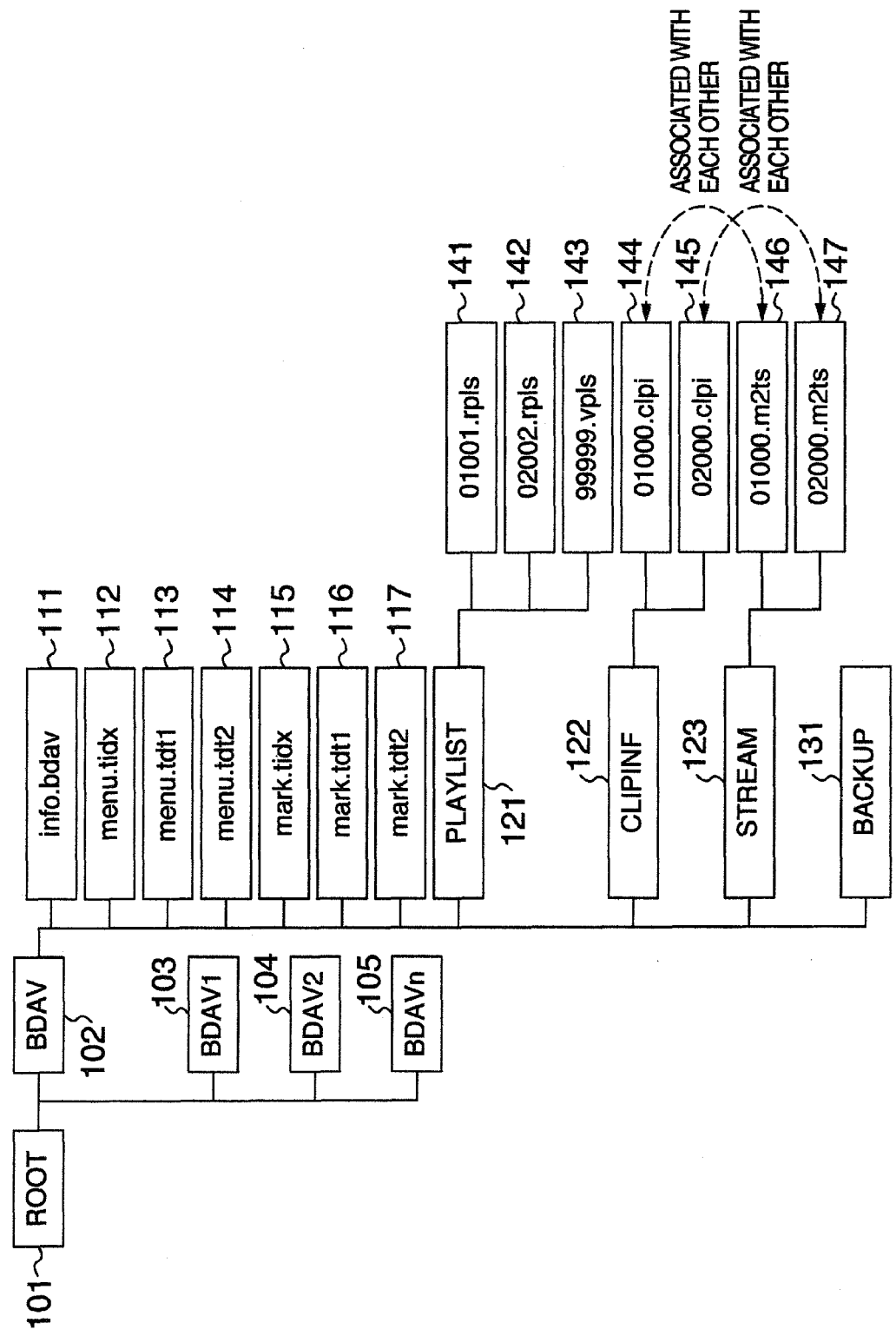
FIG. 1 is a schematic diagram of a directory structure and a file structure.

3501 root directory
3502 BDAV directory
3503 BDAV1 directory
3504 BDAV2 directory
3511 info.bdav file
3512 STREAM directory
3513 info.bdav file
3514 STREAM directory
3515 STREAM directory
3521 recorded program 1
3522 recorded program 2
3523 recorded program 3
3524 recorded program 4
3525 recorded program 5
3531 recorded program 1
3532 recorded program 2
3533 recorded program 3
3534 recorded program 4
3535 recorded program 5
3536 recorded program 6

DETAILED DESCRIPTION OF THE INVENTION

There will be described an embodiment including two layers of a read-only ROM layer (Read Only Memory layer) and a rewritable RE layer (Rewritable layer), as data recording layers included in a hybrid disc.

Figure 34:
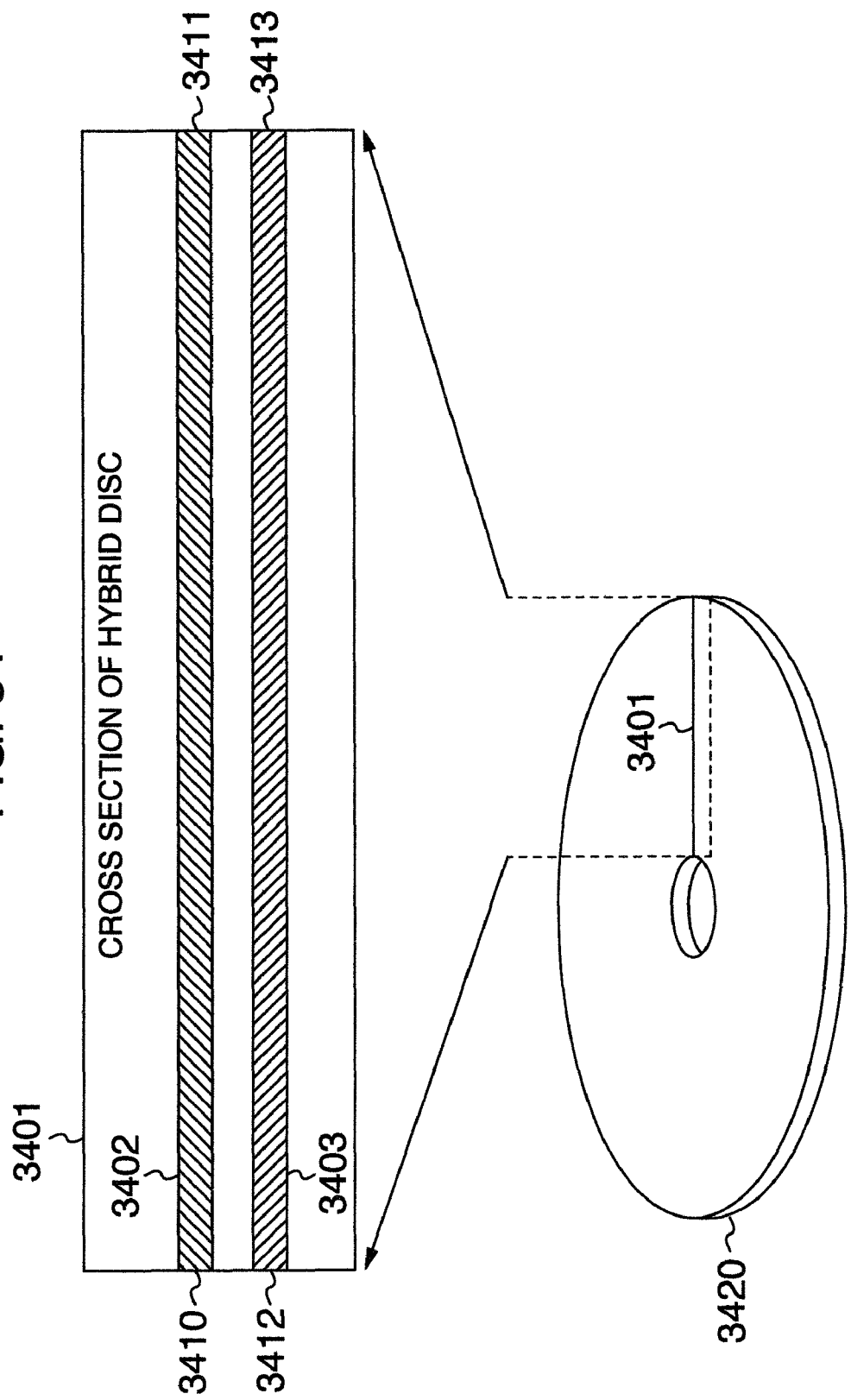
FIG. 34 is a schematic diagram showing a cross section of a hybrid disc.

FIG. 34 schematically describes a cross section made by cutting the hybrid disc at a plane including a rotation axis, in order to describe a positional relationship of the data recording layers included in the hybrid disc.

Reference numeral 3401 denotes the cross section of the hybrid disc. A laser is illuminated from the downside of the figure.

Reference numeral 3402 denotes the RE layer of the hybrid disc. This RE layer is a rewritable recording layer having performance equivalent to a single-layer disc including only the RE layer.

Reference numeral 3403 denotes the ROM layer of the hybrid disc. This ROM layer is a read-only recording layer having performance equivalent to a Layer 1 of a two-layer disc including only the ROM layers.

Reference numeral 3410 denotes a smallest sector address position of the RE layer of the hybrid disc.

Reference numeral 3411 denotes a largest sector address position of the RE layer of the hybrid disc.

Reference numeral 3412 denotes a smallest sector address position of the ROM layer of the hybrid disc.

Reference numeral 3413 denotes a largest sector address position of the ROM layer of the hybrid disc.

Hence, in this configuration, LBA order of the RE layer and the ROM layer monotonically increases toward the same direction.

Reference numeral 3420 denotes a schematic diagram representing the entire hybrid disc, and clearly showing a relationship with the cross section 3401.

In this configuration, as seen from the laser illumination side, the RE layer is located at a deeper position, and the ROM layer is located at a shallower position.

First, the ROM layer will be described.

Application software is recorded on the ROM layer. This application software operates on a recording/reproducing apparatus, and can perform recording and reproducing on the RE layer.

Multiple pieces of the application software may also be recorded on the ROM layer. In that case, a serial number is given to each piece of the application software, and, for example, if the application of the serial number 1 performs the recording on the RE layer, the application performs the recording under a BDAV1 folder 3503 of FIG. 35, and moreover, for example, if the application of the serial number 2 performs the recording on the RE layer, the application performs the recording under a BDAV2 folder 3504 of FIG. 35.

As the application software on the ROM layer, for example, an application assuming operations on a particular OS installed in a personal computer, an application assuming operations on a JAVA (R) virtual machine, an application assuming operations via a web interface, and an embedded application operating on an embedded OS, such as a recorder or a player, are conceivable.

Next, the RE layer will be described.

FIG. 1 is a schematic diagram of a directory structure and a file structure, showing an implementation method of the present invention.

Reference numeral 101 denotes a root directory including at least a BDAV directory 102.

Reference numeral 102 denotes the BDAV directory including a PLAYLIST directory 121, a CLIPINF directory 122, a STREAM directory 123, and a BACKUP directory 131.

The root directory 101 includes external BDAV directories such as a BDAV1 directory 103, a BDAV2 directory 104, and the BDAVn directory 105. Here, n of the BDAVn directory 105 is a continuous natural number beginning with 1, depending on the number of the external BDAV directories. For example, if there are four external BDAV directories under the root directory 101, n is 4, and the external BDAV directories have directory names of BDAV1, BDAV2, BDAV3 and BDAV4, respectively.

The PLAYLIST directory 121 includes management files such as real playlist files 141 and 142 and a virtual playlist 143.

The CLIPINF directory 122 includes management files such as clip information files 144 and 145.

The STREAM directory 123 includes stream files such as stream files 146 and 147.

An info.bdav file 111 is a file in which general information has been stored, and one info.bdav file 111 is stored in each BDAV directory.

In a menu.tidx file 112, header information on menu thumbnails is stored.

In a menu.tdt1 file 113, picture data of the menu thumbnails is stored. A menu.tdt2 file 114 is also a similar file.

In a mark.tidx file 115, header information on mark thumbnails is stored.

In a mark.tdt1 file 116, picture data of the mark thumbnails is stored. A mark.tdt2 file 117 is also a similar file.

The 01001.rpls file 141 includes information regarding a real playlist. One rpls file is generated for each real playlist. The 02002.rpls file 142 is also a similar file.

The 99999.vpls file 143 includes information regarding a virtual playlist. One vpls file is generated for each virtual playlist.

The 01000.clpi file 144 is the clip information file including clip information associated with an AV stream file (a clip AV stream file or a bridge clip AV stream file). The 02000.clpi file 145 is also a similar file.

The 01000.m2ts file 146 is the AV stream file including an MPEG-2 Transport Stream. The 02000.m2ts file 147 is also a similar file.

File names "zzzzz" of the clip information file zzzzz.clpi and the AV stream file zzzzz.m2ts are five-digit integers, and the same five-digit integer is given to the clip information file and the AV stream file which are associated with each other.

It should be noted that a set of the clip information file zzzzz.clpi and the AV stream file zzzzz.m2ts is referred to as "clip".

In this way, the playlist is a file stored in the PLAYLIST directory.

Hereinafter, the real playlist file and the virtual playlist file will be described in detail.

Each of the real playlist and the virtual playlist includes data to be described below.

FIG. 2 is a diagram showing a structure of the playlist file.

Reference numeral 201 denotes a class identifier in which information indicating that the file is a playlist file is stored. For example, a value "PLAYLIST" in ASCII code can be set to identify that the file is the playlist file.

Reference numeral 202 denotes a version number which is a number indicating a version of the playlist file.

Reference numeral 203 denotes a playlist information start address to which a value indicating a relative start position of playlist information within the playlist file, in bytes, is set. The value begins with 0.

Reference numeral 204 denotes a playlist mark information start address to which a value indicating a relative start position of playlist mark information within the playlist file, in bytes, is set. The value begins with 0.

Reference numeral 205 denotes a proprietary data start address to which a value indicating a relative start position of proprietary data information within the playlist file, in bytes, is set. The value begins with 0. If 0 is set to this value, there is no proprietary data information.

Reference numeral 206 denotes user interface application information having a data structure as shown in FIG. 3.

Reference numeral 207 denotes the playlist information having a data structure as shown in FIG. 5.

Reference numeral 208 denotes the playlist mark information.

Reference numeral 209 denotes proprietary data.

FIG. 3 is a diagram showing the structure of the user interface application information, in which parameters for a user interface application of the playlist are stored.

Reference numeral 301 denotes a length indicating a length immediately after this field to the end of the user interface application information.

Reference numeral 321 denotes a hybrid flag in which a value other than 0 is recorded if the playlist is a playlist recorded by the application on the ROM layer, and 0 is recorded if the playlist is a playlist recorded by a user.

Reference numeral 302 denotes a character code in which a character code used for a channel name 314, a playlist name 316, and details of playlist 318 is defined. This character code is also applied to a character code of a mark name in the playlist mark information. For example, if the character code is 1, Japanese language is set, and if the character code is 16, the ASCII code is set, and if the character code is 32, unicode is set.

Reference numeral 303 denotes a reproduction protection flag. If 1 is set, the playlist information such as the playlist name and the thumbnail, and the playlist are not reproduced and displayed to the user. If authentication succeeds through secret number input, the reproduction is performed. If 0 is set, the reproduction is enabled without the secret number input.

Reference numeral 304 denotes a recording protection flag. If 1 is set, the playlist information except the recording protection flag must not be changed or deleted. If 0 is set, the user can freely change or delete the playlist information. If 1 is set, before the user deletes, edits or overwrites the playlist information, the recorder should reconfirm the deletion, the editing or the overwriting with the user. The real playlist having the recording protection flag set to 0 and the virtual playlist having the recording protection flag set to 1 may share the same portion of the clip. In this case, when the user attempts to delete the real playlist, the recorder should reconfirm the deletion with the user before the real playlist is deleted.

Reference numeral 305 denotes a reproduced flag. If 1 is set, this flag indicates that this playlist has been reproduced at least once. If 0 is set, this flag indicates that this playlist has never been reproduced.

Reference numeral 306 denotes an edited flag. If 0 is set, this flag indicates that originally recorded data has been saved without being changed. If 1 is set, this flag indicates that the originally recorded data has been changed.

Reference numeral 307 denotes a time zone having a data structure as shown in FIG. 4.

FIG. 4 is a schematic diagram showing the structure of the time zone.

Reference numeral 401 denotes padding for alignment.

Reference numeral 402 denotes a daylight saving time flag which indicates standard time if 0 is set, and indicates daylight saving time if 1 is set.

Reference numeral 403 denotes a time zone sign which indicates a positive number if 0 is set, and indicates a negative number if 1 is set.

Reference numeral 404 denotes a time zone value indicating an absolute value of time of a difference from UTC (coordinated universal time). A unit is time (=60 minutes). If 15 is set, the time zone value is invalid, indicating that the daylight saving time flag, the time zone sign, and a 30-minute flag are also invalid.

Reference numeral 405 denotes the 30-minute flag. If 1 is set, this flag indicates that the time zone value further has an additional time of a difference of 30 minutes as an absolute value. If 0 is set, this flag indicates that the time zone value has no additional time.

Reference numeral 308 denotes date and time of recording, including information on date and time when the playlist has been recorded. The date and time of recording is indicated in local time. Year, month, day, hour, minute and second are represented in a 4-bit, 1-digit BCD (Binary Coded Decimal). First four digits are four digits of the dominical year.

Reference numeral 309 denotes a playlist length indicating a length of the playlist in units of time. This is obtained by a sum of reproduction times of playitems included in the playlist. The reproduction time of the playitem is a time period from an IN time to an OUT time. The unit is rounded up to a second. Hour, minute and second are represented in a 4-bit, 1-digit BCD.

Reference numeral 310 denotes a manufacturer ID indicating a manufacturer of the recorder which has last updated the playlist.

Reference numeral 311 denotes a manufacturer model code indicating a model number of the recorder which has last updated the playlist.

Reference numeral 312 denotes a channel number which is a broadcast channel number or a service number which has been selected by the user when the playlist has been recorded. In a case of a playlist in which two or more playlists have been coupled, this value indicates a representative value. This value becomes a value equal to or less than 999. If 0xFFFF is set, this value is invalid.

Reference numeral 313 denotes a channel name length indicating a byte length of the channel name. This length becomes a value equal to or less than 20.

Reference numeral 314 denotes the channel name indicating a broadcast channel name or a service name which has been selected by the user when the playlist has been recorded. This field is valid for the byte length indicated by the channel name length 313, from the left end of this field.

Reference numeral 315 denotes a playlist name length indicating a byte length of the playlist name. This length becomes a value equal to or less than 255.

Reference numeral 316 denotes the playlist name including the playlist name. This field is valid for the byte length indicated by the playlist name length 315, from the left end of this field.

Reference numeral 317 denotes a length of the details of playlist, indicating a byte length of the details of playlist. This length becomes a value equal to or less than 1200.

Reference numeral 318 denotes the details of playlist, including detailed text information on the playlist. This field is valid for the byte length indicated by the length of the details of playlist 317, from the left end of this field.

FIG. 5 is a diagram showing the structure of the playlist information.

Reference numeral 501 denotes a length indicating a length immediately after this field to the end of the playlist information.

Reference numeral 502 denotes a playlist CPI class which is a class of an access point referred to by the IN time or the OUT time in the playitem, and which is also an access point class of a mark time stamp in a playlist mark. If 1 is set, the class represents that each access point in the playlist information indicates a display time in the AV stream file, and this information is referred to as the playlist information of an EP_map type. If 2 is set, the class represents that each access point in the playlist information indicates an arrival time, and this information is referred to as the playlist information of a TU_map type.

Reference numeral 503 denotes the number of the playitems, indicating the number of the playitems in the playlist. A playitem ID is an integer beginning with 0. Entries of the playitems in the playlist are sorted in a display order.

Reference numeral 504 denotes the number of sub playitems, indicating the number of the sub playitems in the playlist.

FIG. 6 is a diagram showing a structure of the playitem.

Reference numeral 601 denotes a length indicating a length immediately after this field to the end of playitem information.

Reference numeral 602 denotes a clip information file name indicating a name of a clip information file of a clip used in the playitem information. This field indicates a 5-digit number zzzzz of the file name "zzzzz.clpi". This field is represented by a character string in the ASCII code. A clip stream class field in the clip information file indicates the clip AV stream file (the MPEG-2 Transport Stream).

Reference numeral 603 denotes clip CODEC information. This field has a value indicating "M2TS" in the ASCII code. All the playitems in the playlist information have the clip CODEC information with the same value "M2TS". If the playlist CPI class in the playlist information is set to 1, and the clip CODEC information is set to "M2TS", each clip used in the playlist file has EP_map in CPI information. If the playlist CPI class in the playlist information is set to 2, and the clip CODEC information is set to "M2TS", each clip used in the playlist file has TU_map in the CPI information.

Reference numeral 604 denotes a connection condition indicating a condition of connection between the IN time of a current playitem and the OUT time of a just preceding playitem. The connection condition indicates any of values from 1 to 6. If the playitem is a first playitem in the playlist, the connection condition field is invalid and 1 is set.

Reference numeral 605 denotes STC information. If the CPI class in the CPI information in the clip information file is EP_map, the STC information indicates an STC_ID of an STC sequence in which a presentation unit of the current playitem is included. The clip referred to by the clip information file name of the current playitem has the STC sequence. A value of the STC_ID is defined in sequence information on the clip.

Reference numeral 606 denotes the IN time indicating the IN time of the current playitem, that is, a display start time of the current playitem. A shade of meaning of the IN time is different depending on the CPI class in the CPI in the clip information file referred to by the clip information file name.

Reference numeral 607 denotes the OUT time indicating the OUT time of the current playitem, that is, a display end time of the current playitem. A shade of meaning of the OUT time is different depending on the CPI class of the CPI in the clip information file referred to by the clip information file name.

In a case of EP_map, the IN time and the OUT time refer to the display time based on an STC time of the clip used in the playitem. Moreover, the IN time and the OUT time are measured in units of a 45 kHz clock. For example, the IN time and the OUT time are represented by higher 32 bits of a 33-bit PTS in 90 kHz precision for the presentation unit. Furthermore, a discontinuous point of system time is not included between the IN time and the OUT time. Furthermore, the OUT time refers to time later than the IN time. However, if wrap-around occurs, the IN time becomes larger than the OUT time.

In a case of TU_map, the IN time and the OUT time refer to times in the same TU_time_base as an ATC sequence of the clip referred to by the clip information file name of the playitem. Furthermore, the IN time and the OUT time are measured by a 45 kHz clock. Furthermore, the OUT time is larger than the IN time.

Reference numeral 608 denotes bridge sequence information which will be described in detail in FIG. 7.

FIG. 7 is a diagram showing a structure of the bridge sequence information.

Reference numeral 701 denotes a bridge sequence information file name referring to a name of a clip information file of a bridge clip used in the bridge sequence information. This field includes a 5-digit numerical value (corresponding to zzzzz of the file name) described in the ASCII code. The clip stream class in the clip information in the clip information file becomes the bridge clip AV stream (the MPEG-2 Transport Stream).

Reference numeral 702 denotes clip CODEC information having the value "M2TS" in the ASCII code, and indicating that the playlist file uses the MPEG-2 Transport Stream. The bridge clip used in the bridge sequence information has EP_map in the CPI.

FIG. 8 is a diagram showing a structure of the sub playitem.

Reference numeral 801 denotes a length which is a byte length immediately after this field to the end of the sub playitem.

Reference numeral 802 denotes a clip information file name referring to a name of a clip information file of a clip used in the sub playitem. This field has a 5-digit number corresponding to zzzzz of the name of the clip, in the ASCII code. The clip stream class in the clip information in the clip information file refers to "clip AV stream (the MPEG-2 Transport Stream)".

Reference numeral 803 denotes clip CODEC information having the value "M2TS" in the ASCII code, and indicating that the playlist file uses the MPEG-2 Transport Stream. The clip used in the sub playitem has EP_map in the CPI.

Reference numeral 804 denotes a sub playitem class indicating a class of a sub-path used in the sub playitem, and only a value of 1 is set. A clip AV stream of a sound stream for postrecording is used. Reference numeral 805 denotes an STC_ID indicating the STC_ID corresponding to the STC sequence of the clip which is indicated by the clip information file name, and to which the sub playitem refers. Both a sub playitem IN time and a sub playitem OUT time of the sub playitem refer to the presentation unit in the same STC sequence referred to by the STC_ID.

Reference numeral 806 denotes the sub playitem IN time having a display start time of the sub playitem. The sub playitem IN time is a display time measured from the STC of the clip used in the sub playitem, in 45 kHz precision.

Reference numeral 807 denotes the sub playitem OUT time having a display end time of the sub playitem. The sub playitem OUT time is a display time measured from the STC of the clip used in the sub playitem, in 45 kHz precision. The sub playitem OUT time indicates time later than the sub playitem IN time, and if wrap-around occurs in the STC between the sub playitem IN time and the sub playitem OUT time, the sub playitem IN time becomes larger than the sub playitem OUT time. Both the sub playitem IN time and the sub playitem OUT time indicate a display time of an interval between the display start time and the display end time corresponding to the STC sequence referred to by the STC_ID of the sub playitem.

Reference numeral 808 denotes a synchronized playitem ID referring to the playitem ID of the playitem in the playlist. This playitem includes a sub playitem, and reproduction of the sub playitem is started within the reproduction time of the playitem. The playitem ID is determined in the playlist in the playlist.

Reference numeral 809 denotes a synchronized playitem start PTS indicating a display time in the playitem indicated by the synchronized playitem ID. The sub playitem starts display of the sub playitem itself when the display time of the playitem reaches the synchronized playitem start PTS. The synchronized playitem start PTS is the display time measured by a 45 kHz clock, of the playitem indicated by the synchronized playitem ID.

First, the recording apparatus will be described using FIGS. 9 and 10.

Figure 9:
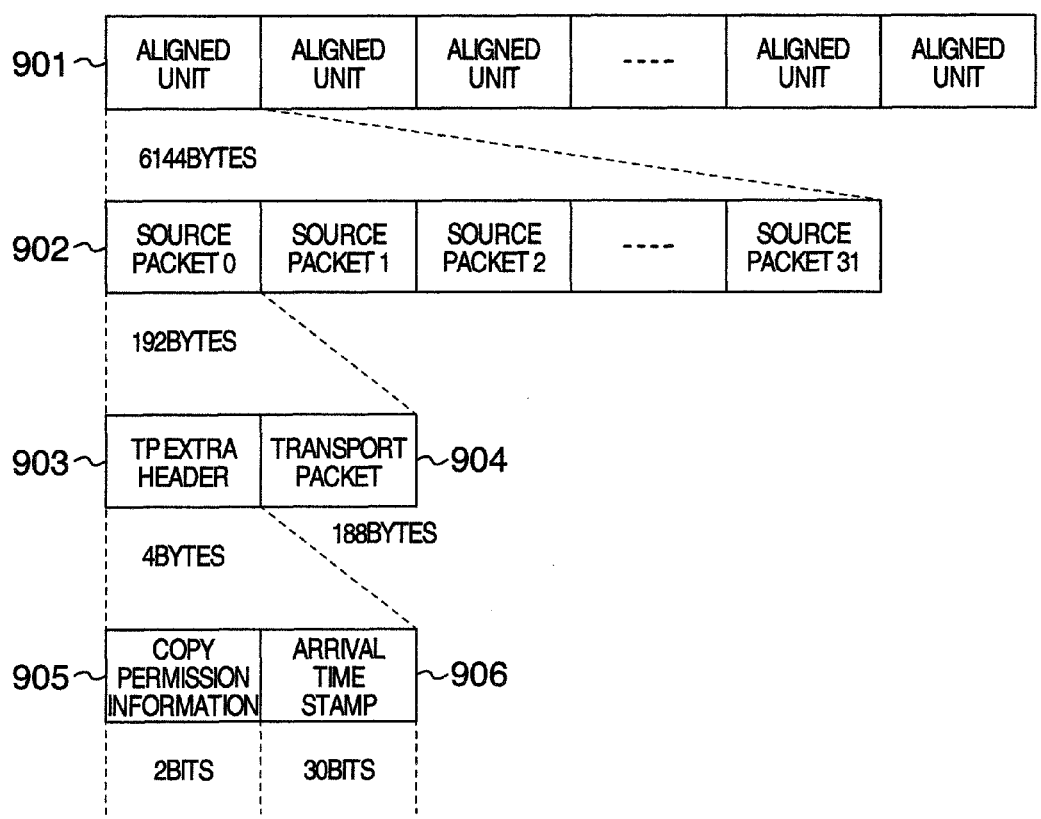
FIG. 9 is a schematic diagram showing a structure of an MPEG-2 Transport Stream.

FIG. 9 is a diagram showing a structure of the MPEG-2 Transport Stream.

The AV stream file has the structure of the MPEG-2 Transport Stream. The MPEG-2 Transport Stream includes aligned units 901 the number of which is a natural number. The aligned unit 901 has a size of 6144 bytes (=2048×3 bytes). The aligned unit 901 starts with a first byte of a source packet 902. A length of the source packet 902 is 192 bytes. One source packet includes a TP extra header 903 and a transport packet 904. A length of the TP extra header 903 is four bytes, and a length of the transport packet 904 is 188 bytes. One aligned unit 901 includes 32 source packets 902. A last aligned unit 901 in the MPEG-2 Transport Stream includes 32 source packets 902. Hence, the MPEG-2 Transport Stream is terminated at the end of the aligned unit 901. If the last aligned unit 901 has not been filled with inputted transport streams, remaining bytes are filled with transport packets of a PID=0x1FFF, that is, source packets which are null packets.

The transport packet 904 is defined in ISO/IEC 13818-1.

The TP extra header 903 includes copy permission information 905 and an arrival time stamp 906. The copy permission information 905 includes content protection information on a relevant transport packet 904. A value of the arrival time stamp to be described later is set to the arrival time stamp 906.

Figure 10:
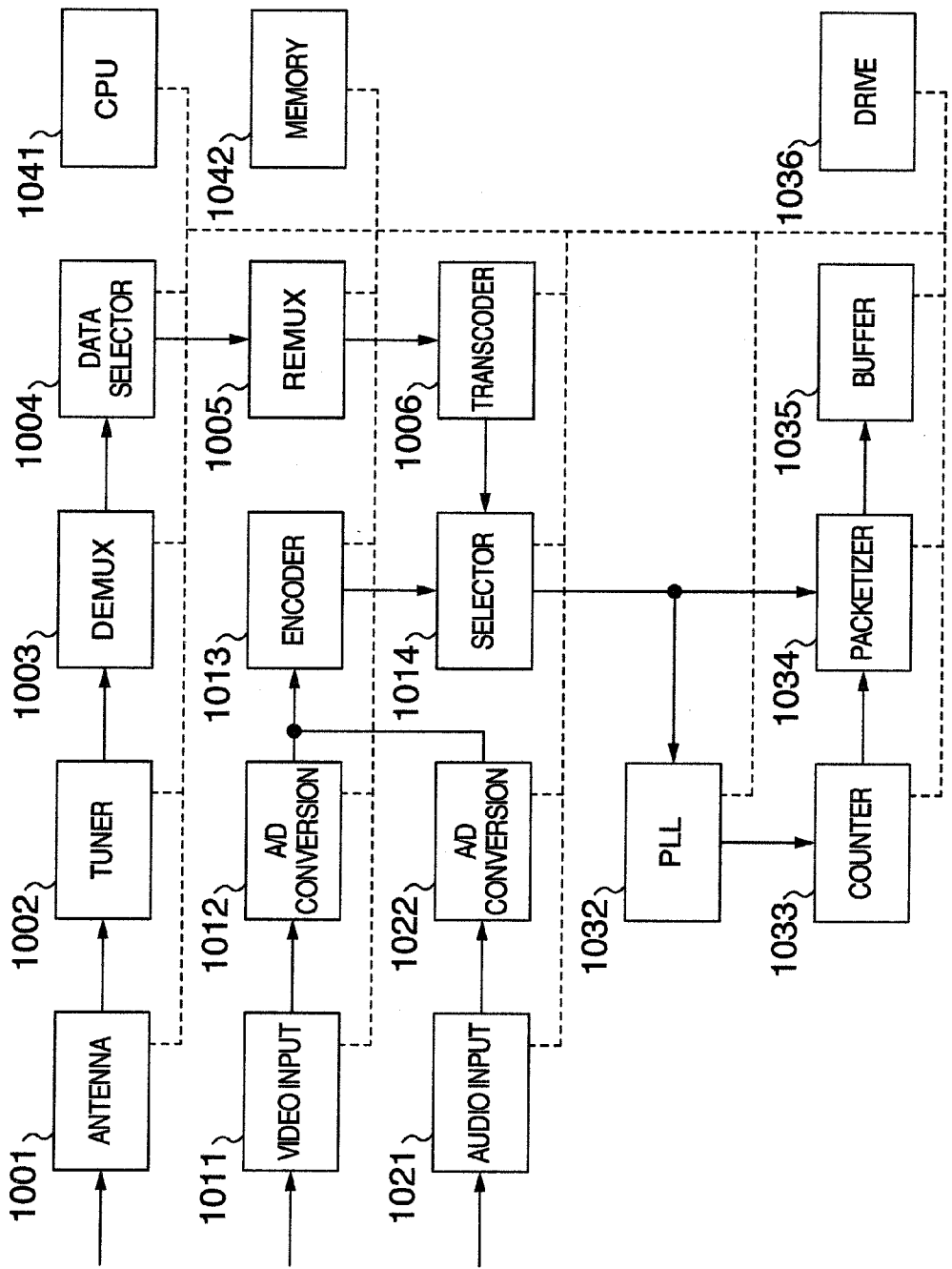
FIG. 10 is a schematic diagram of a recorder, showing an implementation scheme.

FIG. 10 is a schematic diagram of the recorder, showing an implementation scheme of the present invention.

Reference numeral 1001 denotes an antenna which inputs a digital broadcast wave.

Reference numeral 1002 denotes a tuner which receives the digital broadcast wave inputted from the antenna 1001.

Reference numeral 1003 denotes a DEMUX which separates the digital broadcast wave (a full TS (Transport Stream)) received by the tuner 1002, into elementary streams, if necessary.

Reference numeral 1004 denotes a data selector which selects a necessary stream from the elementary streams separated by the DEMUX 1003, if necessary.

Reference numeral 1005 denotes a REMUX which multiplexes the stream transmitted from the data selector, into the MPEG-2 Transport Stream again, if necessary, and thereby converts the stream into a partial TS (Transport Stream).

Reference numeral 1006 denotes a transcoder which converts a format of an audio stream or a video stream of the TS inputted from the REMUX 1005, if necessary.

Reference numeral 1011 denotes a video input which inputs an analog video signal.

Reference numeral 1012 denotes A/D conversion which converts analog data inputted from the video input 1011, into digital data.

Reference numeral 1021 denotes an audio input which inputs an analog audio signal.

Reference numeral 1022 denotes A/D conversion which converts analog data inputted from the audio input 1021, into digital data.

Reference numeral 1013 denotes an encoder which encodes the video data and the audio data digitalized by the A/D conversion 1012 and 1022, into the MPEG-2 Transport Stream.

Reference numeral 1014 denotes a selector which switches and inputs the stream transmitted from the transcoder 1006 or the encoder 1013.

Reference numeral 1031 denotes a T_STD which is a transport system target decoder to which the MPEG-2 Transport Stream at time i is inputted.

Reference numeral 1032 denotes a PLL which is at a 27-MHz frequency, and is synchronized with a PCR (Program Clock Reference) of the inputted MPEG-2 Transport Stream.

Reference numeral 1033 denotes a counter which is a binary counter for counting a pulse signal of the 27-MHz frequency. A count value i at time i is passed as an arrival time clock (i) to a packetizer 1034.

Reference numeral 1034 denotes the packetizer which adds the TP extra headers to all the transport packets to generate a source packet stream and the aligned unit. The generated source packet stream is transferred to a write buffer 1035 at a maximum transfer rate RMAX. The packetizer 1034 has a small capacity buffer therein, and averages bit rates of the streams. While a peak rate of digital broadcast may also exceed the RMAX, the transfer rate to the write buffer 1035 is ensured to be equal to or less than the RMAX, by the internal buffer.

The arrival time stamp is time when the first byte of the source packet has arrived at the T_STD 1031 and the packetizer 1034. An arrival time stamp (k) is a sample value of an arrival time clock (k). (See the following equation)

Arrival time stamp (k)=Arrival time clock (k)%(2 to the thirtieth power)

A maximum value of a difference between the arrival time stamps of two consecutive packets is (230−1)/27000000 seconds (=approximately 40 seconds).

In such a case where the difference exceeds this value, the arrival time stamps are changed so that the difference becomes this maximum value. The recorder also needs to previously suppose such a case. When an MPEG-2 Transport Stream player to be described later outputs the transport stream according to the arrival time stamp, PCR precision of the transport stream to be outputted is defined in ISO/IEC 13818-9.

Reference numeral 1035 denotes the buffer which is the write buffer for writing the source packet transferred from the packetizer 1034, into a drive 1036.

A TS recording rate defined in the clip information on the AV stream file determines a value of the RMAX. This RMAX is calculated as follows.

RMAX=TS recording rate×192/188

A unit of the TS recording rate is bytes/second.

A maximum recording rate of the drive is RUD. If the buffer 1035 is not empty, a recording rate to the drive 1036 is RUD. If the buffer 1035 is empty, the recording rate to the drive 1036 is 0. The buffer 1035 is not overflowed.

Reference numeral 1036 denotes the drive which writes the stream inputted from the write buffer 1035, into a recording medium such as an optical disc at the maximum recording rate RUD.

Reference numeral 1041 denotes a CPU in charge of control of the recording in the entire recorder. The CPU is connected to each block within the recorder via a CPU bus indicated by a dashed line, and exchanges data and performs the control.

Reference numeral 1042 denotes a memory which is used as a work memory of the CPU 1041, a buffer of the encoder, or the like.

Next, a reproducing apparatus will be described using FIG. 11.

Figure 11:
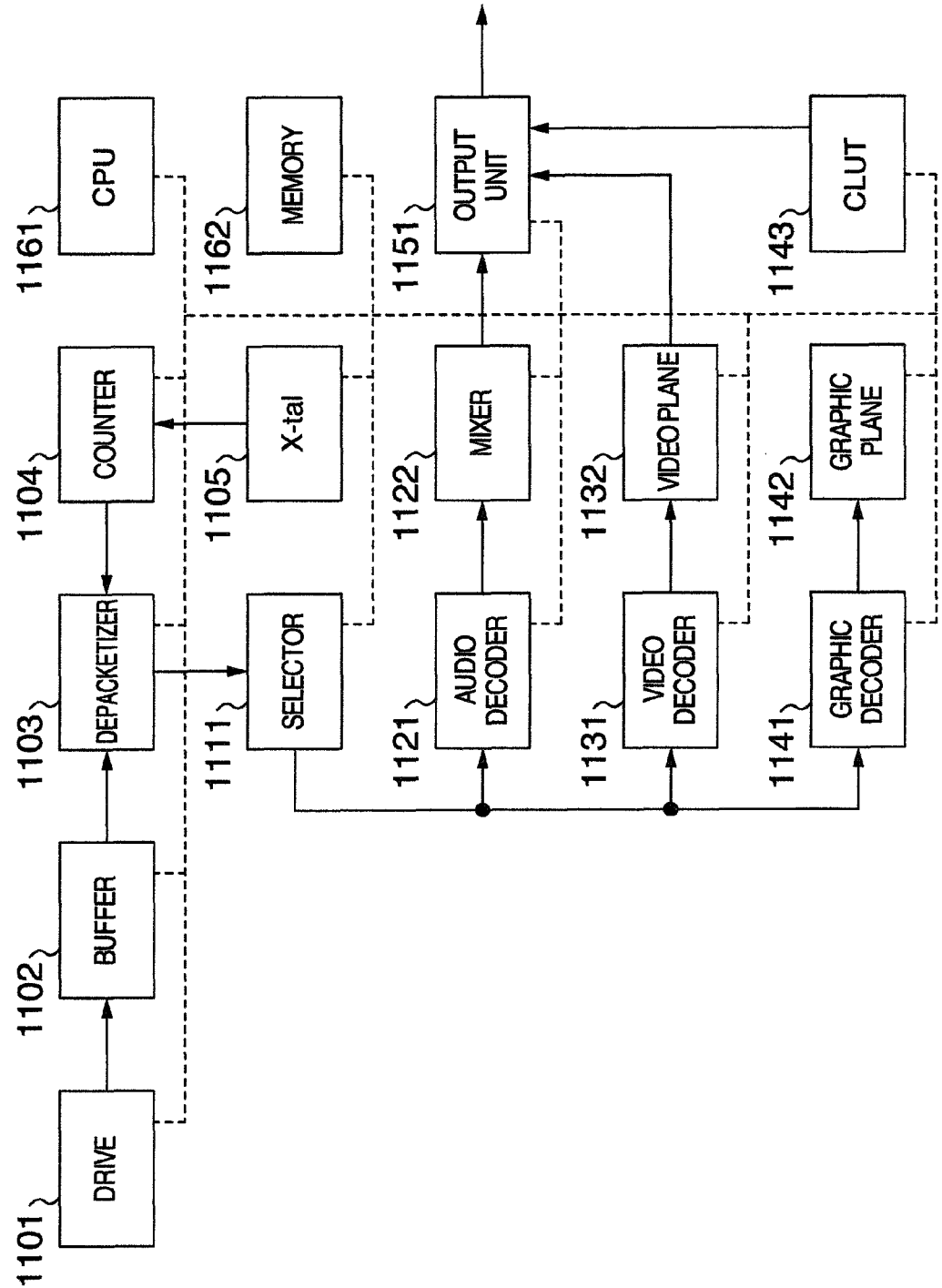
FIG. 11 is a schematic diagram of a player, showing an implementation scheme.

FIG. 11 is a schematic diagram of the player, showing an implementation scheme of the present invention.

Reference numeral 1101 denotes a drive which reads out the MPEG-2 Transport Stream from the recording medium such as the optical disc, and transfers the MPEG-2 Transport Stream to a buffer 1102.

Reference numeral 1102 denotes the buffer which buffers the MPEG-2 Transport Stream read out from the drive 1101.

Reference numeral 1103 denotes a depacketizer which separates the MPEG-2 Transport Stream inputted from the buffer 1102, into the TP extra headers and the transport packets, synchronizes the arrival time stamps with an arrival time clock inputted from a counter 1104, and outputs the transport packets. An initial value of the arrival time clock is first passed to the counter 1104.

Reference numeral 1104 denotes the counter which counts a 27-MHz pulse signal from an X-tal 1105, beginning with the initial value received from the depacketizer 1103, and passes the arrival time clock to the depacketizer 1103.

Reference numeral 1105 denotes the X-tal which generates the 27-MHz pulse signal.

Reference numeral 1111 denotes a selector which switches the transport packets inputted from the depacketizer 1103 for each class, and passes each transport packet to a corresponding decoder.

Reference numeral 1121 denotes an audio decoder which decodes an audio packet inputted from the selector 1111, and passes the decoded audio packet to a mixer 1122.

Reference numeral 1122 denotes the mixer which performs mixing such as volume setting for multichannel audio at a designated ratio, if necessary.

Reference numeral 1131 denotes a video decoder which decodes a video packet inputted from the selector 1111, and passes the decoded video packet to a video plane 1132.

Reference numeral 1132 denotes the video plane which is a plane buffer for expanding picture data decoded by the video decoder 1131, and displaying the picture data.

Reference numeral 1141 denotes a graphic decoder which decodes a graphic packet inputted from the selector 1111, and passes the decoded graphic packet to a graphic plane 1142.

Reference numeral 1142 denotes the graphic plane which is a plane buffer for expanding graphic data inputted from the graphic decoder 1141.

Reference numeral 1143 denotes a CLUT (Color Look Up Table) which is a table referring to RGB data and alpha blend data corresponding to each pixel on the graphic plane 1142.

Reference numeral 1151 denotes an output unit which multiplexes the inputted audio/video/graphic data, and outputs the data in an analog format such as YCbCr or a digital format such as HDMI, from the player to the outside.

Reference numeral 1161 denotes a CPU in charge of control of the reproduction in the entire player. The CPU is connected to each block within the player via a CPU bus indicated by a dashed line, and exchanges data and performs the control.

Reference numeral 1162 denotes a memory which is used as a work memory of the CPU 1161, a buffer of the decoder, or the like.

Figure 12:
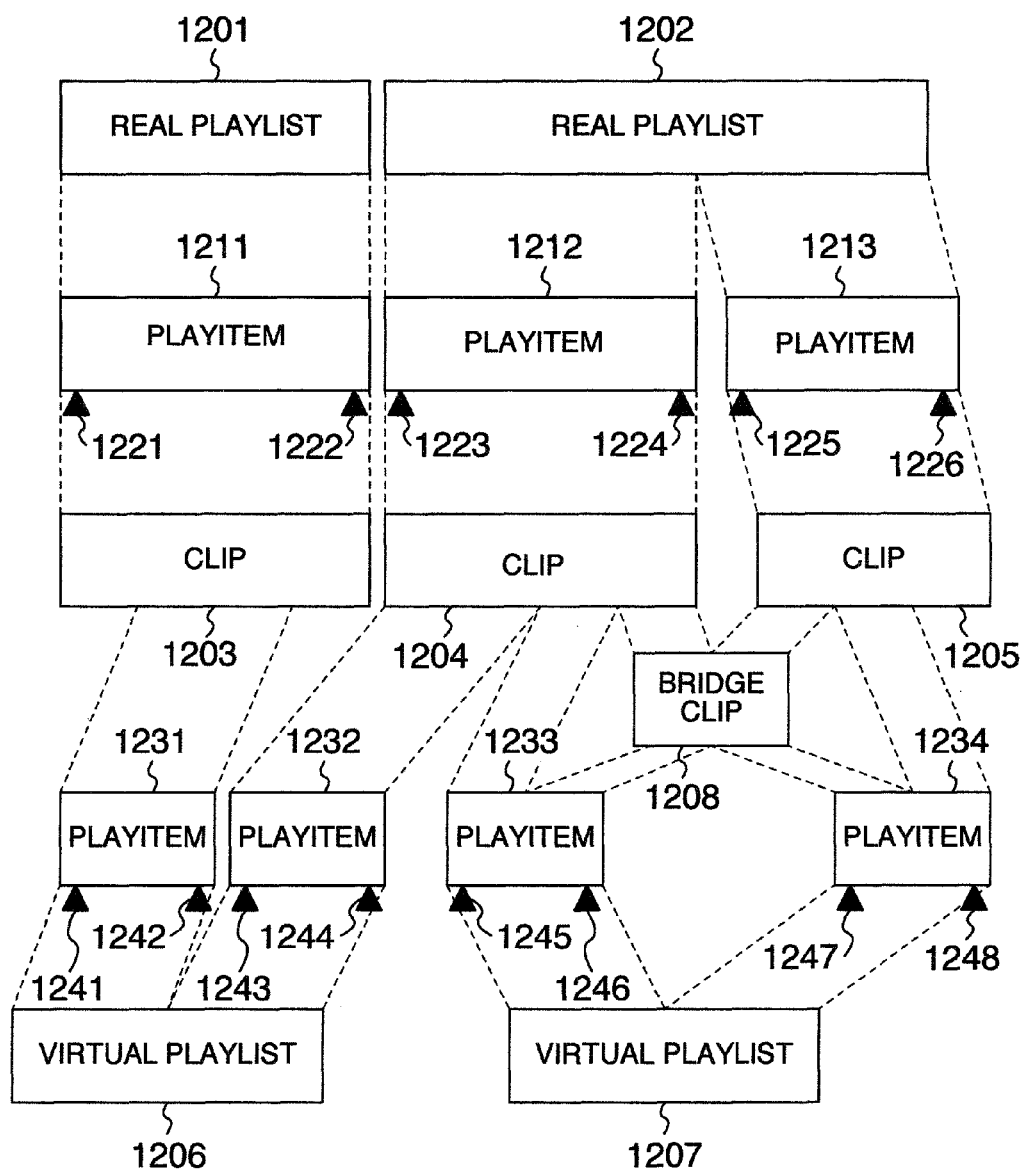
FIG. 12 is a schematic diagram of real playlists and virtual playlists.

FIG. 12 is a schematic diagram of the real playlists and the virtual playlists, showing an implementation method of the present invention.

Reference numeral 1201 denotes a first real playlist referring to a playitem 1211.

Reference numeral 1202 denotes a second real playlist referring to a playitem 1212 and a playitem 1213.

Reference numeral 1211 denotes a first playitem referring to a clip 1203.

Reference numeral 1212 denotes a second playitem referring to a clip 1204.

Reference numeral 1213 denotes a third playitem referring to a clip 1205.

Reference numeral 1203 denotes a first clip.

Reference numeral 1204 denotes a second clip.

Reference numeral 1205 denotes a third clip.

Reference numeral 1231 denotes a fourth playitem referring to a part of the clip 1203.

Reference numeral 1232 denotes a fifth playitem referring to a part of the clip 1204.

Reference numeral 1233 denotes a sixth playitem referring to a part of the clip 1204 and a part of a bridge clip 1208.

Reference numeral 1234 denotes a seventh playitem referring to a part of the bridge clip 1208 and a part of the clip 1205.

Reference numeral 1206 denotes a first virtual playlist referring to the playitem 1231 and the playitem 1232.

Reference numeral 1207 denotes a second virtual playlist referring to the playitem 1233 and the playitem 1234.

Reference numeral 1208 denotes a first bridge clip which has been re-encoded from data of an ending portion of the clip 1204 and data of a beginning portion of the clip 1205.

The playlist will be described.

The playlist enables the user to easily edit a reproduction time of a clip desired to be reproduced. For example, the user can perform editing by cut-and-paste, without moving, copying or deleting (including partial moving, partial copy and partial deletion of) a clip file entity. The playlist is a collection of a series of reproduction sections referred to as "playitems" in the clip, and the playitem is represented by a set of an IN point and an OUT point. The IN point and the OUT point are time information indicating positions in a time axis included in the clip. Hence, the playlist can be said to be a collection of the playitems. Moreover, the IN point means a reproduction start position of the reproduction section, and the OUT point means a reproduction end position of the reproduction section. There are two kinds of playlists, that is, the real playlist and the virtual playlist.

The real playlist will be described.

The real playlist is used for the clip AV stream file, and is not used for the bridge clip AV stream file. The real playlist refers to a certain portion of the clip.

The same size of a data space on the disc, as a size of (a part of) the clip referred to, is consumed by the reference performed by the real playlist. When the real playlist is deleted, (a part of) the clip referred to is deleted.

The virtual playlist will be described.

The virtual playlist is used for both the clip AV stream file and the bridge clip AV stream file. When the virtual playlist is used for the clip AV stream file, the virtual playlist has no data entity. However, if the virtual playlist is used for the bridge clip AV stream file, the virtual playlist has the data entity. If the virtual playlist not using the bridge clip AV stream file is deleted, the clip is not changed.

On the other hand, if the virtual playlist using the bridge clip AV stream file is deleted, the clip AV stream file and the clip information file associated therewith are not changed, while the bridge clip AV stream file and the clip information file associated therewith are deleted.

The clip is a management unit for internally controlling the player or the recorder, and is not displayed on a user interface. Only the playlist is shown to the user.

Operations on the playlist include the followings.

Operations related to operations on the real playlist include the followings.

(1) Generation of Real Playlist

A real playlist which is generated when a broadcasted program is first recorded becomes such a real playlist referring to the entire recorded clip.

Figure 13:
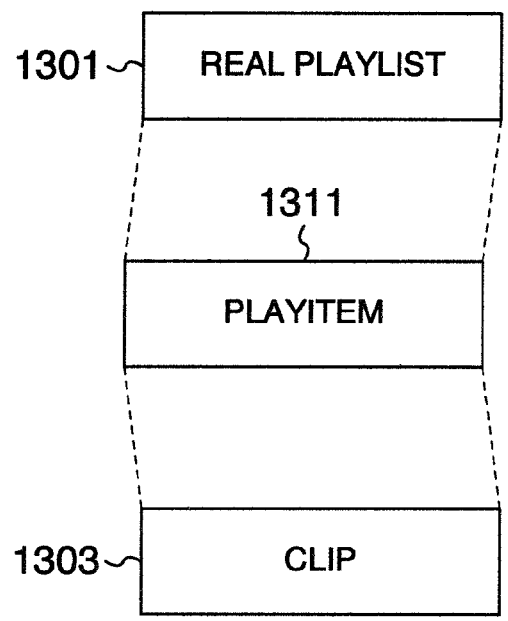
FIG. 13 is a schematic diagram showing an example of generating the real playlist.

FIG. 13 is a diagram showing an example of generating the real playlist.

Reference numeral 1301 denotes a real playlist referring to a playitem 1311. When the recording is newly performed, the real playlist is generated as one playlist file.

Reference numeral 1311 denotes the playitem referring to a clip 1303.

Reference numeral 1303 denotes the clip which is generated as one clip information file and one AV stream file when the recording is newly performed.

(2) Division of Real Playlist

If one real playlist is divided into two real playlists, the clip itself is not caused to change.

Figure 14:
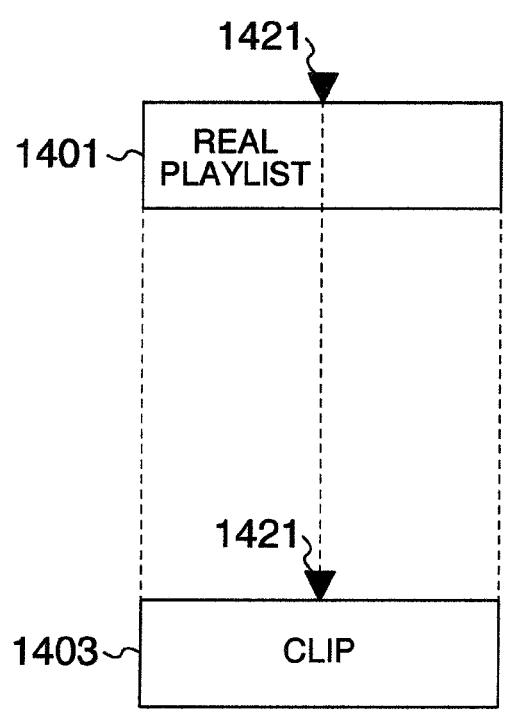
FIG. 14 is a schematic diagram showing an example of dividing the real playlist.
Figure 15:
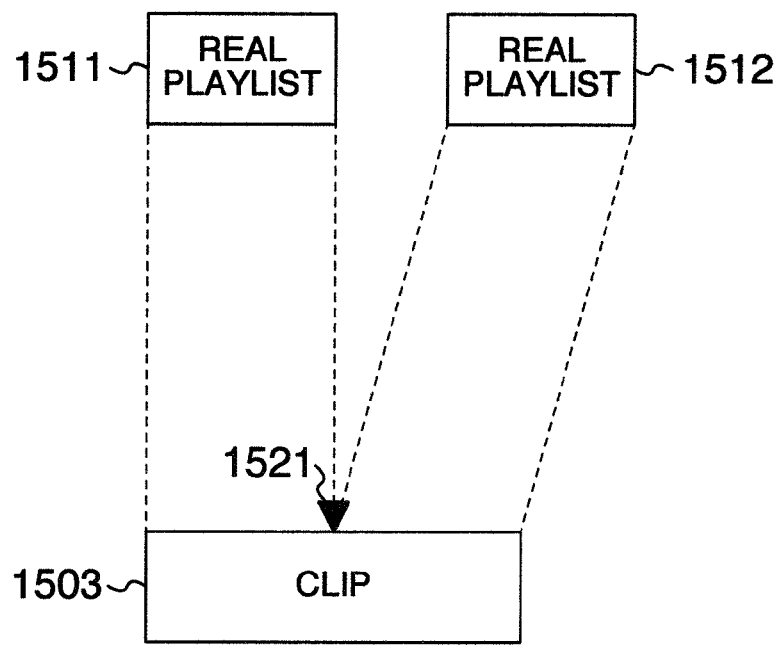
FIG. 15 is a schematic diagram showing an example of dividing the real playlist.

FIGS. 14 and 15 are diagrams showing an example of dividing the real playlist.

Reference numeral 1401 denotes a real playlist referring to a clip 1403 via a not-shown playitem.

Reference numeral 1403 denotes the clip.

Reference numeral 1421 denotes a division point, showing an example of dividing the real playlist 1401 at near the center thereof.

Reference numeral 1511 denotes a real playlist referring to a part (a portion corresponding to the left side of a division point 1521) of a clip 1503 via a not-shown playitem.

Reference numeral 1503 denotes the clip which is the same as the clip 1403.

Reference numeral 1512 denotes a real playlist referring to a part (a portion corresponding to the right side of the division point 1521) of the clip 1503 via a not-shown playitem.

(3) Concatenation of Real Playlists

If two real playlists are concatenated as one new real playlist, the clip itself is not caused to change.

Figure 16:
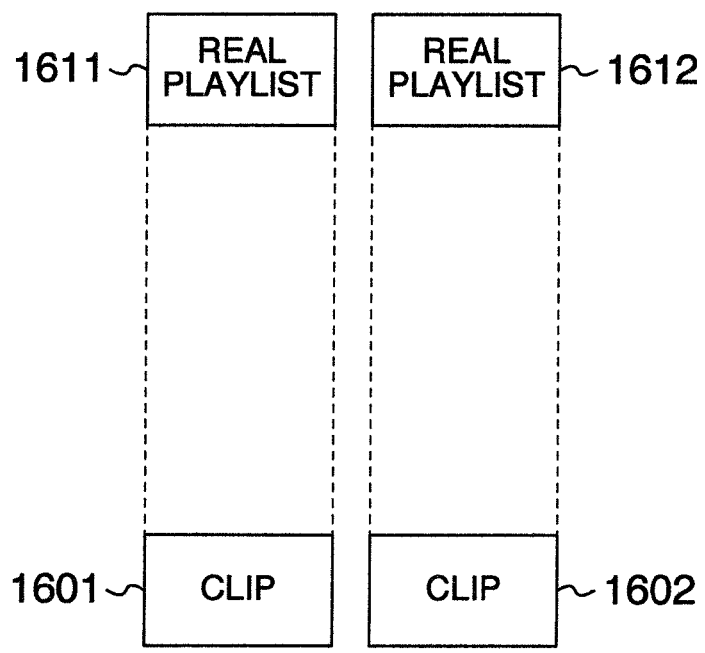
FIG. 16 is a schematic diagram showing an example of concatenating the real playlists.
Figure 17:
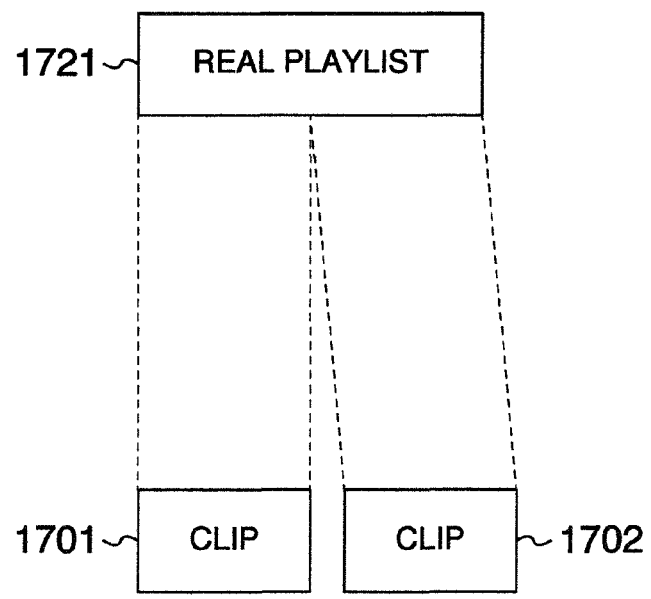
FIG. 17 is a schematic diagram showing an example of concatenating the real playlists.

FIGS. 16 and 17 are diagrams showing an example of concatenating the real playlists.

Reference numeral 1611 denotes a real playlist referring to a clip 1601 via a not-shown playitem.

Reference numeral 1601 denotes the clip.

Reference numeral 1612 denotes a real playlist referring to a clip 1602 via a not-shown playitem.

Reference numeral 1602 denotes the clip.

Reference numeral 1701 denotes a clip which is the same as the clip 1601.

Reference numeral 1702 denotes a clip which is the same as the clip 1602.

Reference numeral 1721 denotes a real playlist referring to the clip 1701 and the clip 1702 via not-shown playitems.

(4) Deletion of Entire Real Playlist

If one entire real playlist is deleted, a range referred to is deleted in the clip referred to.

Figure 18:
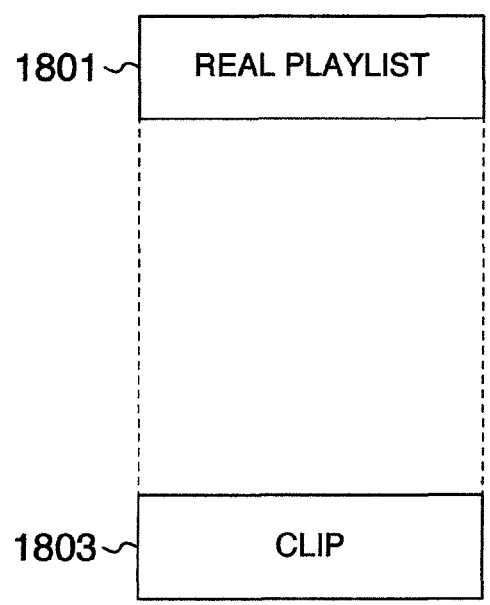
FIG. 18 is a schematic diagram showing an example of deleting the real playlist.

FIG. 18 is a diagram showing an example of deleting the real playlist.

Reference numeral 1801 denotes a real playlist referring to a clip 1803 via a not-shown playitem.

Reference numeral 1803 denotes the clip.

(5) Partial Deletion of Real Playlist

If a part of the clip to which the real playlist refers is deleted, the playitem is changed to keep a necessary portion, while a portion which is no longer referred to in the clip is deleted.

Figure 19:
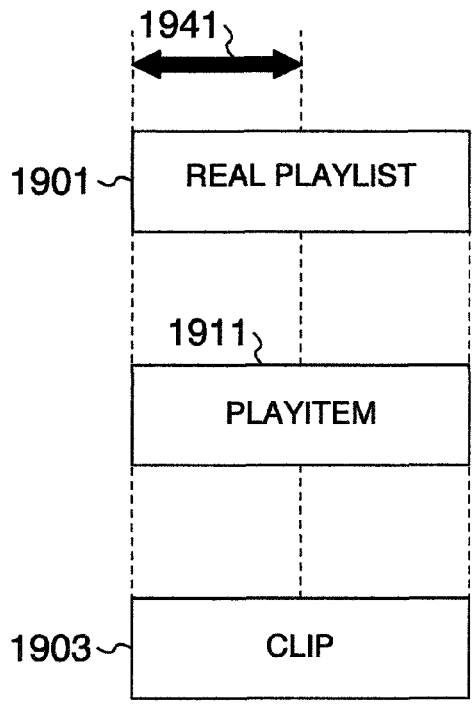
FIG. 19 is a schematic diagram showing an example of partially deleting a beginning portion of the real playlist.
Figure 20:
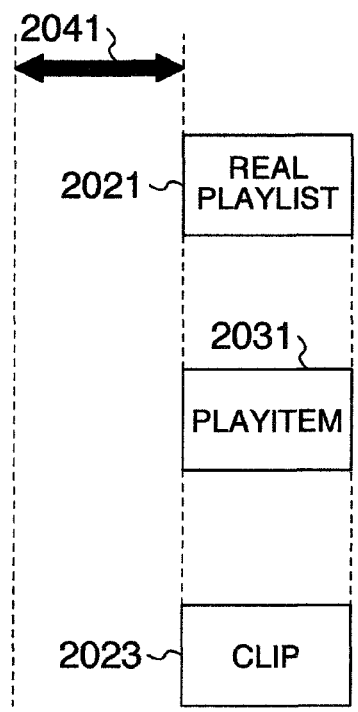
FIG. 20 is a schematic diagram showing an example of partially deleting the beginning portion of the real playlist.

FIGS. 19 and 20 are diagrams showing an example of partially deleting a beginning portion of the real playlist.

Reference numeral 1901 denotes a real playlist referring to a playitem 1911.

Reference numeral 1911 denotes the playitem referring to a clip 1903.

Reference numeral 1903 denotes the clip.

Reference numeral 2021 denotes a real playlist referring to a playitem 2031.

Reference numeral 2041 denotes a range to be deleted, showing an example of partially deleting a portion corresponding to the left side of the real playlist 1901.

Reference numeral 2031 denotes the playitem referring to a clip 2023.

Reference numeral 2023 denotes the clip.

If a middle portion of the clip AV stream is edited and deleted, remaining portions are concatenated as one clip file.

Figure 21:
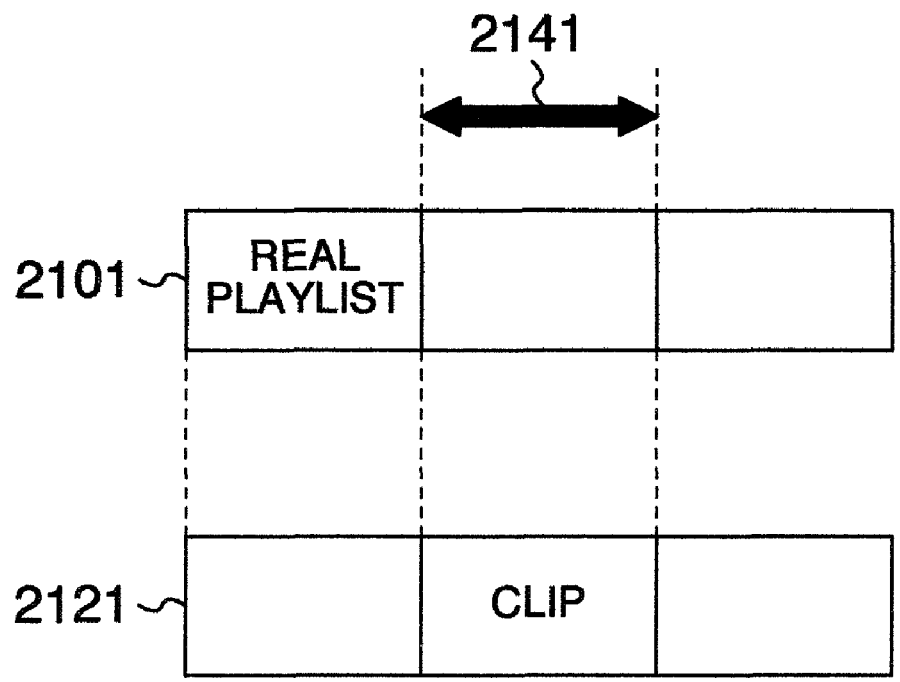
FIG. 21 is a schematic diagram showing an example of partially deleting a middle portion of the real playlist.
Figure 22:
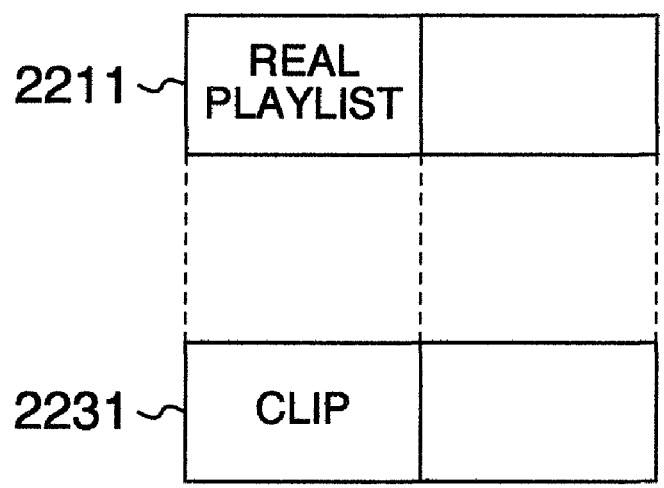
FIG. 22 is a schematic diagram showing an example of partially deleting the middle portion of the real playlist.

FIGS. 21 and 22 are diagrams showing an example of partially deleting the middle portion of the real playlist.

Reference numeral 2101 denotes a real playlist referring to a clip 2121 via a not-shown playitem.

Reference numeral 2121 denotes the clip.

Reference numeral 2141 denotes a range to be deleted, showing an example of partially deleting a portion corresponding to a middle area of the real playlist 2101 (=extraction and deletion of a middle portion).

Reference numeral 2211 denotes a real playlist referring to a clip 2231 via a not-shown playitem.

Reference numeral 2231 denotes the clip.

Operations related to operations on the virtual playlist include the followings.

(1) Assemble Editing

As shown in FIGS. 23 to 26, the user can generate a playitem desired to be reproduced, and concatenate the playitem with another playitem by using the virtual playlist.

Reproduction with a smooth connection at a concatenation point can be realized by generating a bridge clip file. In order to seamlessly connect and reproduce MPEG video streams, the seamless connection and the reproduction are generally realized by re-encoding a very small number of pictures near the concatenation point, as a bridge clip.

According to this process, an original clip AV stream file and the clip information file thereof need not be changed.

Figure 23:
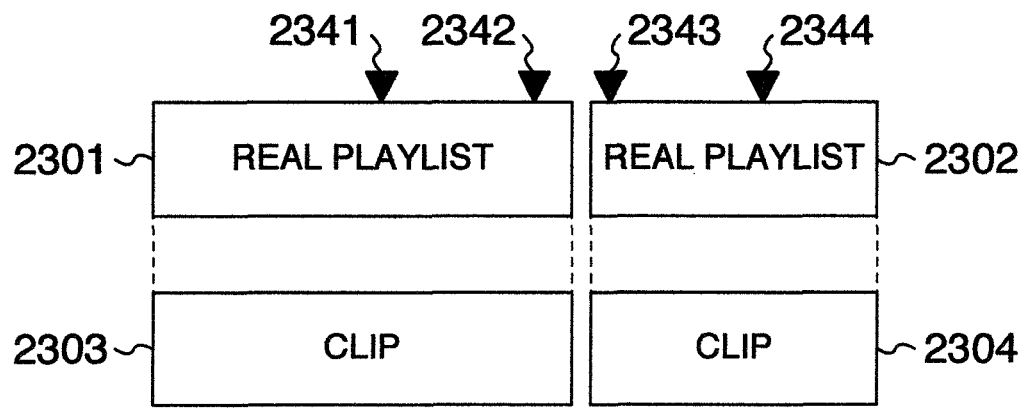
FIG. 23 is a schematic diagram showing an example of assemble editing (non-seamless connection of two playitems)
Figure 24:
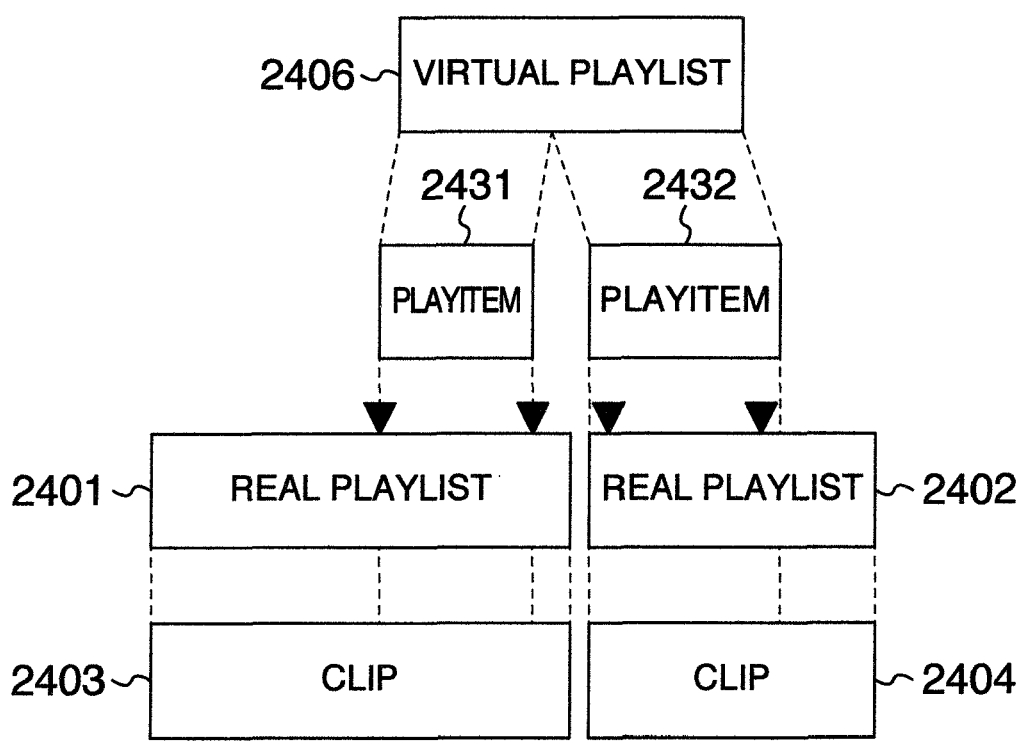
FIG. 24 is a schematic diagram showing an example of the assemble editing (the non-seamless connection of two playitems)

FIGS. 23 and 24 are diagrams showing an example of assemble editing (non-seamless connection of two playitems).

Reference numeral 2301 denotes a real playlist referring to a clip 2303 via a not-shown playitem.

Reference numeral 2303 denotes the clip.

Reference numeral 2302 denotes a real playlist referring to a clip 2304 via a not-shown playitem.

Reference numeral 2304 denotes the clip.

Reference numeral 2341 denotes an IN point which becomes an IN time of a playitem 2431 to be registered in a virtual playlist.

Reference numeral 2342 denotes an OUT point which becomes an OUT time of the playitem 2431 to be registered in the virtual playlist.

Reference numeral 2343 denotes an IN point which becomes an IN time of a playitem 2432 to be registered in the virtual playlist.

Reference numeral 2344 denotes an OUT point which becomes an OUT time of the playitem 2432 to be registered in the virtual playlist.

Reference numeral 2406 denotes the virtual playlist referring to the playitem 2431 and the playitem 2432.

Reference numeral 2431 denotes the playitem referring to a part of a real playlist 2401.

Reference numeral 2432 denotes the playitem referring to a part of a real playlist 2402.

Reference numeral 2403 denotes a clip which is the same as the clip 2303.

Reference numeral 2404 denotes a clip which is the same as the clip 2304.

Figure 25:
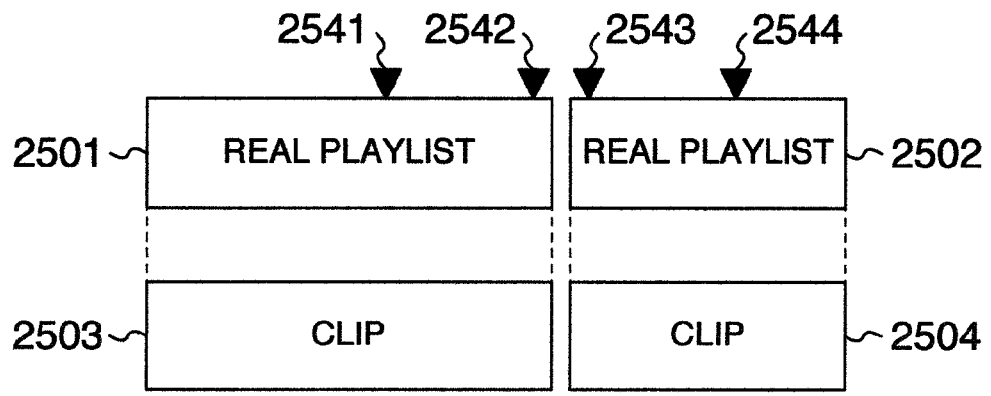
FIG. 25 is a schematic diagram showing an example of the assemble editing (seamless connection of two playitems)
Figure 26:
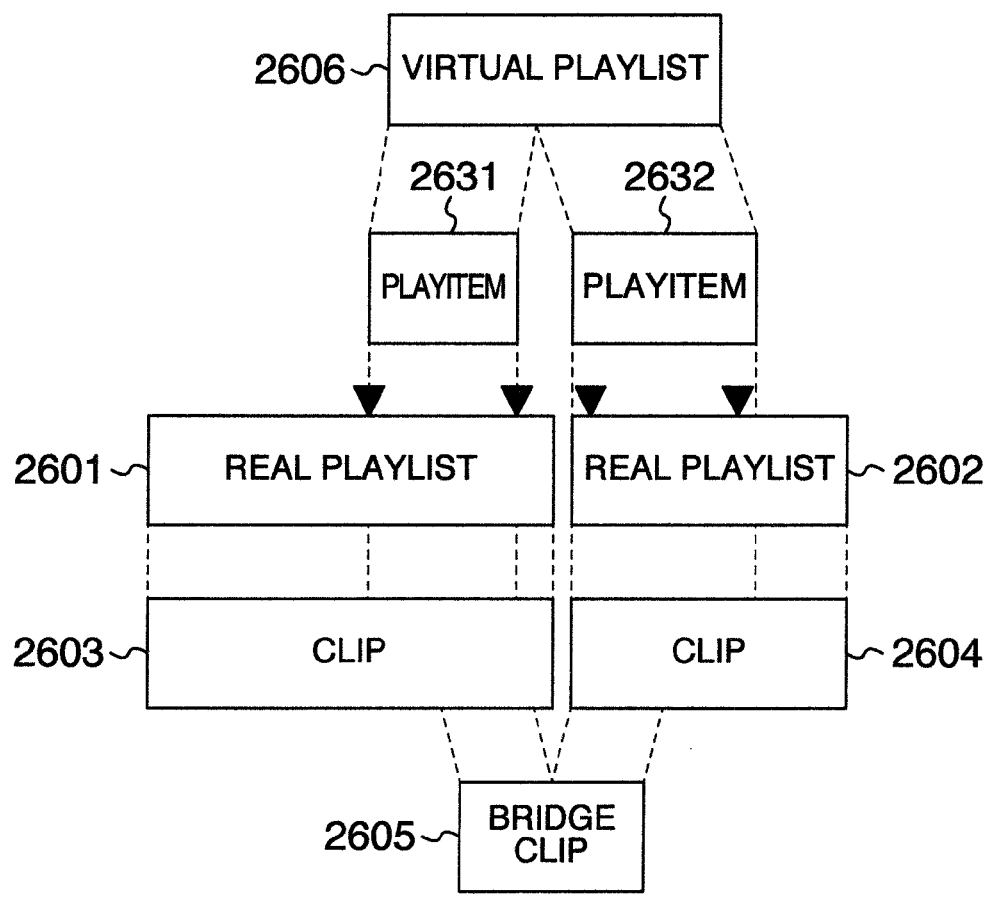
FIG. 26 is a schematic diagram showing an example of the assemble editing (the seamless connection of two playitems)

FIGS. 25 and 26 are diagrams showing an example of the assemble editing (seamless connection of two playitems).

Reference numeral 2501 denotes a real playlist referring to a clip 2503 via a not-shown playitem.

Reference numeral 2503 denotes the clip.

Reference numeral 2502 denotes a real playlist referring to a clip 2504 via a not-shown playitem.

Reference numeral 2504 denotes the clip.

Reference numeral 2541 denotes an IN point which becomes an IN time of a playitem 2631 to be registered in a virtual playlist.

Reference numeral 2542 denotes an OUT point which becomes an OUT time of the playitem 2631 to be registered in the virtual playlist.

Reference numeral 2543 denotes an IN point which becomes an IN time of a playitem 2632 to be registered in the virtual playlist.

Reference numeral 2544 denotes an OUT point which becomes an OUT time of the playitem 2632 to be registered in the virtual playlist.

Reference numeral 2606 denotes the virtual playlist referring to the playitem 2631 and the playitem 2632.

Reference numeral 2631 denotes the playitem referring to a part of a real playlist 2601.

Reference numeral 2632 denotes the playitem referring to a part of a real playlist 2602.

Reference numeral 2603 denotes a clip which is the same as the clip 2503.

Reference numeral 2604 denotes a clip which is the same as the clip 2504.

(2) Re-Editing of Virtual Playlist

An editing method is conceivable in which the IN point or the OUT point of the playitem in the virtual playlist is changed by adding/inserting the playitem to/into the virtual playlist, or deleting the playitem in the virtual playlist.

A process is conceivable in which the recorder alerts the user that an existing bridge clip is deleted and a new bridge clip needs to be generated if the IN point or the OUT point referring to the bridge clip is changed by the user's operation, and the recorder executes such a process after the user's confirmation is obtained.

(3) Deletion of Virtual Playlist

The entire virtual playlist is deleted.

(4) Postrecording-Editing in Virtual Playlist

Additional sound can be recorded (=postrecording) for the virtual playlist. The sound to be added can be added as a sub-path.

Operations common to the virtual playlist and the real playlist include the followings.

(1) Change of Playlist Reproduction Order

This change is realized by changing a playlist table defining a playlist reproduction order. The clip itself is not changed by this operation.

Next, an embodiment in the recording/reproducing apparatus is shown.

Figure 27:
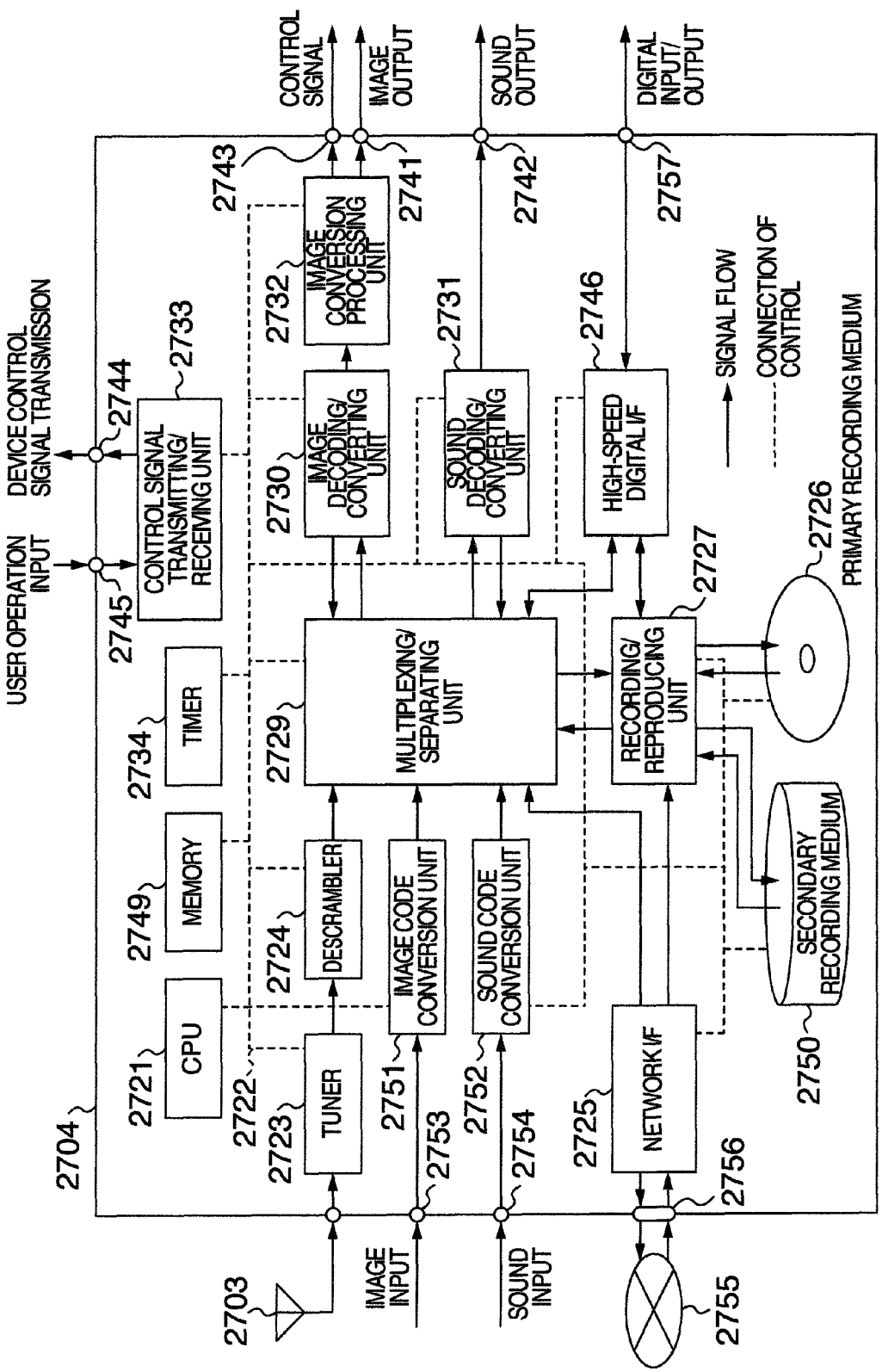
FIG. 27 is a schematic diagram of the recorder, showing an implementation scheme.

FIG. 27 is a hardware configuration diagram showing a configuration example of the recording/reproducing apparatus. Reference numeral 2704 denotes the recording/reproducing apparatus; reference numeral 2703 denotes an antenna which receives a broadcast signal transmitted from a transmitting apparatus, for example, via a wireless (satellite, terrestrial) or cable broadcast transmission network; reference numeral 2721 denotes a CPU (Central Processing Unit) which controls the entire recording/reproducing apparatus; reference numeral 2722 denotes a general purpose bus for performing control and transmitting information between the CPU 2721 and each unit within the recording/reproducing apparatus; reference numeral 2723 denotes a tuner which receives the broadcast signal transmitted from the transmitting apparatus, for example, via the wireless (satellite, terrestrial) or cable broadcast transmission network, selects a particular frequency, performs demodulation, an error correction process and the like, and outputs multiplexed packets such as the MPEG2-Transport Stream (hereinafter also referred to as "TS"); reference numeral 2724 denotes a descrambler which decodes a scramble of the broadcast signal inputted from the tuner 2723; reference numeral 2725 denotes a network I/F (Interface) which transmits and receives information to and from a network 2755 outside the apparatus, via a network terminal 2756, and transmits and receives various kinds of information and the MPEG2-TS between the Internet and the recording/reproducing apparatus; reference numeral 2726 denotes a primary recording medium, for example, such as a removable HDD, a disc-type recording medium or a flash memory; reference numeral 2750 denotes a secondary recording medium, for example, such as an HDD (Hard Disk Drive) or a flash memory included in the recording/reproducing apparatus, or a removable HDD, a disc-type recording medium or a flash memory; reference numeral 2727 denotes a recording/reproducing unit which controls the primary recording medium 2726 and the secondary recording medium 2750, and controls recording of data into the primary recording medium 2726 and the secondary recording medium 2750, and reproduction of the data from the primary recording medium 2726 and the secondary recording medium 2750; and reference numeral 2729 denotes a multiplexing/separating unit which separates data multiplexed in a format such as the MPEG2-TS, into data such as an image ES (Elementary Stream), a sound ES, program information, closed caption information and graphic data, or multiplexes the data such as the image ES and the sound ES into the format such as the MPEG2-TS. The ES means each piece of compressed/coded image/sound data. Reference numeral 2730 denotes an image decoding/converting unit which decodes the image ES into image data, or converts the image ES into an image ES in another format; reference numeral 2731 denotes a sound decoding/converting unit which decodes the sound ES into sound data and outputs the decoded sound data from a sound output 2742, or converts the sound ES into a sound ES in another format and outputs the converted sound ES to the multiplexing/separating unit 2729; reference numeral 2732 denotes an image conversion processing unit which performs a conversion process for converting the image data decoded by the image decoding/converting unit 2730, from 3D image data to 2D image data, or converting the image data from the 2D image data to the 3D image data, according to an instruction from the above described CPU, or performs a process for superimposing a display such as a 2D or 3D OSD (On Screen Display) created by the CPU 2721, on the image data, a process for converting the data into a predetermined format such as HDMI, or the like, and subsequently, outputs the processed image data to an image signal output unit 2741, and outputs a synchronization signal or a control signal (used for controlling devices) corresponding to the format of the processed image data, from the image signal output unit 2741 and a control signal output unit 2743; reference numeral 2733 denotes a control signal transmitting/receiving unit which receives an operation input from a user operation input unit 2745 (for example, a key code from a remote controller for transmitting an IR (Infrared Radiation) signal), and transmits a device control signal (for example, IR) for an external device, which has been generated by the CPU 2721 or the image conversion processing unit 2732, from a device control signal transmitting unit 2744; reference numeral 2734 denotes a timer which has an internal counter and retains current time; and reference numeral 2746 denotes a high-speed digital I/F, such as a serial interface or an IP interface, which applies a necessary process such as encryption to the TS reconstructed by the above described multiplexing/separating unit, and outputs the processed TS to the outside from a digital input/output terminal 2757, or decodes the TS received from the outside via the digital input/output terminal 2757 and inputs the decoded TS to the multiplexing/separating unit 2729. The recording/reproducing apparatus mainly includes these devices.

Figure 28:
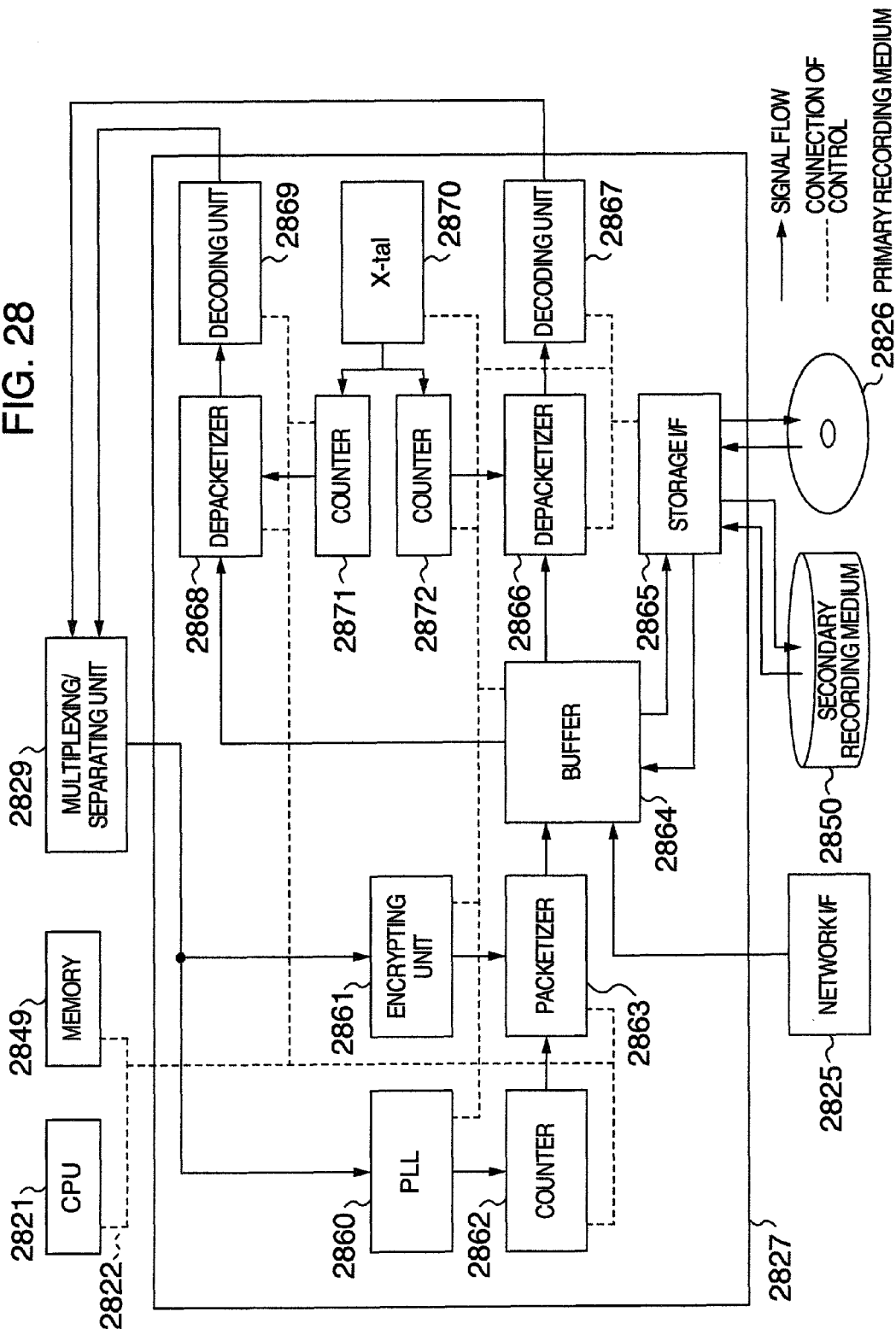
FIG. 28 is a schematic diagram of a recording/reproducing unit of the recorder, showing an implementation scheme.

FIG. 28 is a hardware configuration diagram showing a detailed configuration example of the recording/reproducing unit 2727 in FIG. 27, within the recording/reproducing apparatus.

Reference numeral 2827 denotes the recording/reproducing unit 2727 in FIG. 27.

Reference numeral 2821 denotes the CPU 2721 in FIG. 27.

Reference numeral 2829 denotes the multiplexing/separating unit 2729 in FIG. 27.

Reference numeral 2825 denotes the network I/F 2725 in FIG. 27.

Reference numeral 2826 denotes the primary recording medium 2726 in FIG. 27.

Reference numeral 2850 denotes the secondary recording medium 2750 in FIG. 27.

Reference numeral 2860 denotes a PLL at a 27-MHz frequency, which is synchronized with a PCR (Program Clock Reference) of an MPEG-2TS inputted from the multiplexing/separating unit 2829.

Reference numeral 2861 denotes an encrypting unit which performs encryption such as an AES (Advanced Encryption System) for the MPEG-2TS inputted from the multiplexing/separating unit 2829.

Reference numeral 2862 denotes a counter which counts a 27-MHz pulse signal inputted from the PLL.

Reference numeral 2863 denotes a packetizer which divides the MPEG2-TS inputted from the encrypting unit 2861, into fixed-length data, adds a header including an arrival time stamp generated based on a count value inputted from the counter 2862, to the data, and outputs the data with the header as fixed-length packets.

Reference numeral 2864 denotes a write buffer which temporarily stores the packets inputted from the packetizer 2863. Furthermore, this buffer is also a write buffer which temporarily stores data downloaded from a network via the network I/F 2825. Furthermore, this buffer is also a read buffer which temporarily stores the reproduced data inputted from a storage I/F 2865.

Reference numeral 2865 denotes the storage I/F which transfers the data to the primary recording medium 2826 and the secondary recording medium 2850 via the buffer 2864. The storage I/F is connected to the primary recording medium 2826 and the secondary recording medium 2850 via a data bus such as a SATA (Serial ATA) bus, and transfers the data according to a SATA protocol or the like.

Reference numerals 2866 and 2868 denote depacketizers which separate the MPEG-2 Transport Stream inputted from the buffer 2864, into the TP extra headers and the transport packets, synchronize the arrival time stamps with an arrival time clock inputted from a counter 2872, and output the transport packets.

Reference numerals 2867 and 2869 denote decoding units which decode the encrypted transport packets.

Reference numeral 2870 denotes an X-tal which generates a 27-MHz pulse signal.

Reference numerals 2871 and 2872 denote counters which count the 27-MHz pulse signal from the X-tal 2870, beginning with initial values received from the depacketizers 2866 and 2868, and pass the arrival time clocks to the depacketizers 2866 and 2868.

Moreover, although not shown in FIG. 28, in input and output of the data to and from the high-speed digital I/F 2746 in FIG. 27, similarly to the network I/F 2825, the digital data inputted from the high-speed digital I/F 2746 is temporarily stored in the buffer 2864, and recorded on the primary recording medium 2826 or the secondary recording medium 2850, and the digital data reproduced from the primary recording medium 2826 or the secondary recording medium 2850 is temporarily stored in the buffer 2864, and outputted from the high-speed digital I/F 2746.

Figure 29:
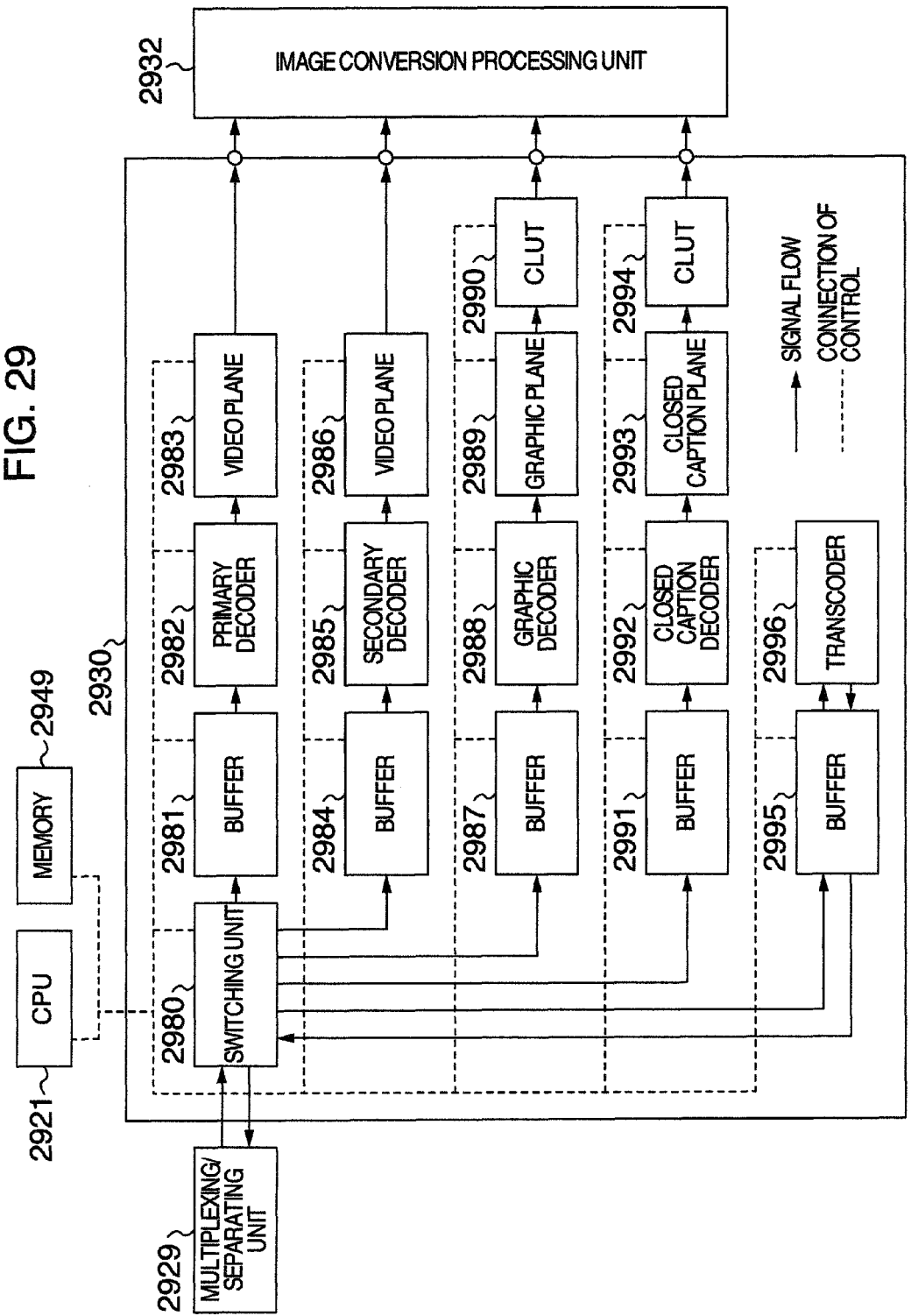
FIG. 29 is a schematic diagram of an image decoding/converting unit of the recorder, showing an implementation scheme.

FIG. 29 is a hardware configuration diagram showing a detailed configuration example of the image decoding/converting unit 2730 in FIG. 27, within the recording/reproducing apparatus.

Reference numeral 2921 denotes the CPU unit 2721 in FIG. 27.

Reference numeral 2949 denotes a memory 2749 in FIG. 27.

Reference numeral 2929 denotes the multiplexing/separating unit 2729 in FIG. 27.

Reference numeral 2932 denotes the image conversion processing unit 2732 in FIG. 27.

Reference numeral 2930 denotes the image decoding/converting unit 2730 in FIG. 27.

Reference numeral 2980 denotes a switching unit having a function of a PID filter for sorting and transferring the transport packets inputted from the multiplexing/separating unit 2929, to blocks which have been set, depending on PIDs.

Reference numerals 2981, 2984, 2987, 2991 and 2995 denote buffers which temporarily buffer the transport packets inputted to and outputted from the switching unit 2980.

Reference numeral 2982 denotes a primary decoder which decodes transport packets of a coded/compressed image stream inputted via the buffer 2981.

Reference numeral 2983 denotes a video plane which is a display plane buffer for expanding the image data decoded by the primary decoder 2982.

Reference numeral 2985 denotes a secondary decoder which decodes transport packets of a coded/compressed image stream inputted via the buffer 2984.

Reference numeral 2986 denotes a video plane which is a display plane buffer for expanding the image data decoded by the secondary decoder 2985.

Reference numeral 2988 denotes a graphic decoder which decodes transport packets of graphic data inputted via the buffer 2987.

Reference numeral 2989 denotes a graphic plane which is a plane buffer for expanding the graphic data decoded and drawn by the graphic decoder 2988.

Reference numeral 2990 denotes a CLUT which performs a conversion process for replacing the graphic data expanded on the graphic plane 2989, with display data.

Reference numeral 2992 denotes a closed caption decoder which decodes transport packets of closed caption data inputted via the buffer 2991.

Reference numeral 2993 denotes a closed caption plane which is a plane buffer for expanding the closed caption data decoded and drawn by the closed caption decoder 2992.

Reference numeral 2994 denotes a CLUT which performs a conversion process for replacing the closed caption data expanded on the closed caption plane 2993, with display data.

Reference numeral 2996 denotes a transcoder which transcodes transport packets of a coded/compressed image stream inputted via the buffer 2995, into an image stream which is in another format or has another bit rate, and outputs the image stream to the buffer 2995 again.

The data outputted from the video planes 2983 and 2986 as well as the CLUTs 2990 and 2994 is transferred to the image conversion processing unit 2932.

Recording operations of the present embodiment will be described.

Figure 30:
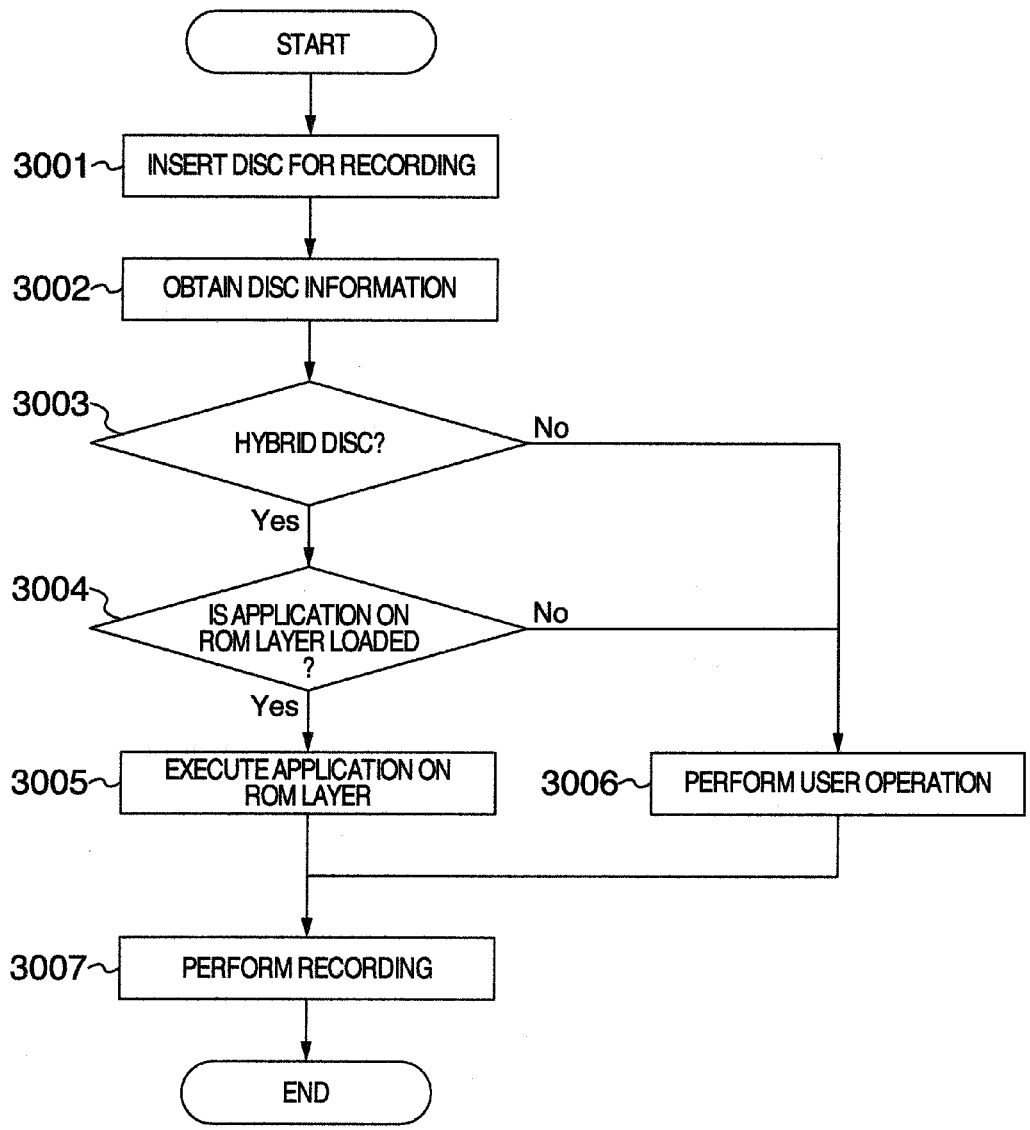
FIG. 30 is a flow diagram of a recording process.

FIG. 30 is a process flow diagram showing operations in a case of recording on the RE layer of the hybrid disc.

Figure 35:
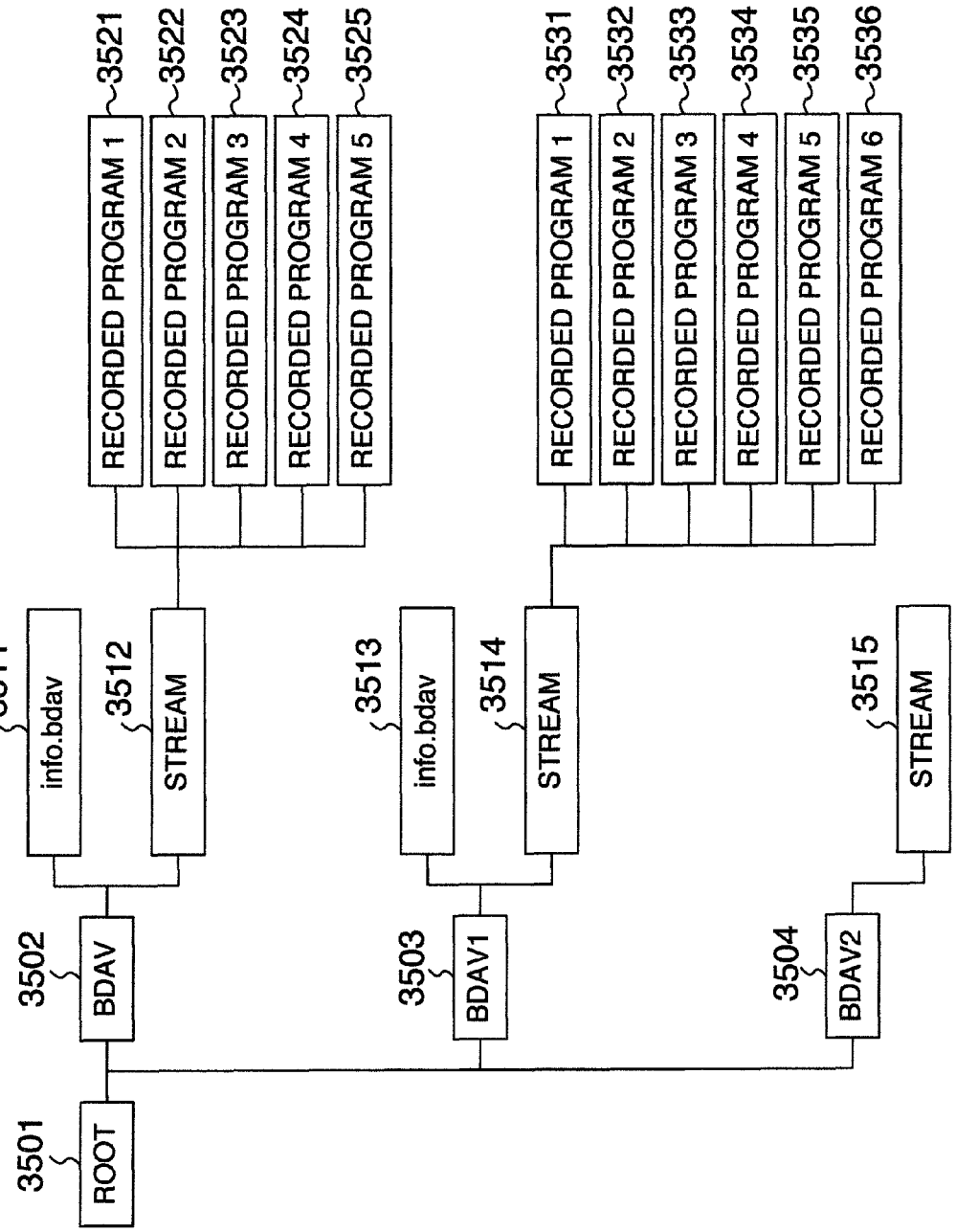
FIG. 35 is a schematic diagram of the directory structure and the file structure.

FIG. 35 is a schematic diagram showing a folder structure of a program recorded on the RE layer of the hybrid disc.

When the hybrid disc is inserted into the recording/reproducing apparatus (step 3001), the recording/reproducing unit 2727 accesses the hybrid disc corresponding to the primary recording medium 2726, and obtains disc information such as a medium class (step 3002).

The CPU 2721 analyzes the obtained disc information and determines whether or not the disc is the hybrid disc (step 3003). If it is determined that the disc is not the hybrid disc, the user performs a recording start process (step 3006). If it is determined that the disc is the hybrid disc, a message asking whether or not to load and execute the application recorded on the ROM layer is displayed on the OSD screen to ask the user to confirm it (step 3004). If the user selects to execute the application, an application program on the ROM layer is executed (step 3005). If the user does not select to execute the application, the user performs the recording start process (step 3006).

In a case of step 3005, the program is recorded in a subfolder under a BDAV folder 3502 (step 3007). At this time, 1 is recorded in a hybrid flag 3602 of an info.bdav file 3511, and the manufacturer ID and the model code assigned to the application on the ROM layer are recorded in a manufacturer ID 3702 and a model code 3703 of proprietary data 3608.

In a case of step 3006, the program is recorded in a subfolder under the BDAV1 folder 3503 (step 3007). At this time, 0 is recorded in the hybrid flag 3602 of an info.bdav file 3513, and the manufacturer ID and the model code assigned to the recorder are recorded in the manufacturer ID 3702 and the model code 3703 of the proprietary data 3608.

A root directory 3501 of FIG. 35 is the same as the root directory 101, and the BDAV directory 3502 is the same as the BDAV directory 102. In FIG. 35, while only a STREAM directory 3512 is displayed under the BDAV directory 3502, a directory configuration under the BDAV directory 3502 is the same as that under the BDAV directory 102. Directory configurations under the BDAV1 directory 3503 and the BDAV2 directory 3504 are also similar. An example is shown in which five stream files from a recorded program 1 to a recorded program 5 are recorded under the STREAM directory 3512.

FIG. 36 is a diagram showing a structure of the info.bdav file.

Reference numeral 3601 denotes a class in which information indicating that the file is the info.bdav file is recorded.

Reference numeral 3602 denotes the hybrid flag. If the hybrid flag has a value other than 0, the hybrid flag indicates that the program recorded by the application on the ROM layer is included under the BDAV folder including this info.bdav file. If the hybrid flag is 0, the hybrid flag indicates that the program recorded by the user is included.

Reference numeral 3603 denotes a version number in which a numerical value indicating a version of this info.bdav file is recorded.

Reference numeral 3604 denotes a playlist table start address in which a beginning offset of a playlist table 3607 is recorded.

Reference numeral 3605 denotes a proprietary data start address in which a beginning offset of the proprietary data 3608 is recorded.

Reference numeral 3606 denotes general information in which information related to the entire BDAV folder including this info.bdav file is recorded.

Reference numeral 3607 denotes the playlist table in which a file name list of the playlist files recorded under the BDAV folder including this info.bdav file is recorded.

Reference numeral 3608 denotes the proprietary data including information indicating a manufacturer which has recorded the program under the BDAV folder including this info.bdav file, and information which has been uniquely recorded by the manufacturer.

FIG. 37 is a diagram showing a structure of the proprietary data 3608.

Reference numeral 3701 denotes a length indicating a length of the proprietary data 3608.

Reference numeral 3702 denotes the manufacturer ID indicating the manufacturer which has recorded the program under the BDAV folder including this info.bdav file.

Reference numeral 3703 denotes the model code indicating information specifying a model of a device (recorder), software or the like which has recorded the program under the BDAV folder including this info.bdav file.

Reference numeral 3704 denotes a proprietary data start address in which a beginning offset of a proprietary data body 3706 is recorded.

Reference numeral 3705 denotes a proprietary data length which is a length of the proprietary data body 3706.

Reference numeral 3706 denotes the proprietary data body which is information which has been uniquely recorded by the manufacturer which has recorded the program under the BDAV folder including this info.bdav file.

A state where a channel to be recorded has been selected before the recording is started is considered as an initial state.

In this state, the digital broadcast wave received by the tuner 2723 via the antenna 2703 is descrambled by the descrambler 2724, and separated into an image stream, a sound stream, other graphic streams, a closed caption stream and the like by the multiplexing/separating unit 2729, and each stream is transferred to the decoder.

The image stream is expanded by the image decoding/converting unit 2730, the image data is converted by the image conversion processing unit 2732 if necessary, and the control signal and the image output are outputted from the output terminals 2743 and 2741.

As described above, in this state, the outputted image output is displayed on a monitor display connected to this recording/reproducing apparatus, so that the user can view the outputted image output.

Next, a process in step 3006 will be described in detail in which the recording operation is started by the user depressing a recording button, or by the recorder starting the recording at a reserved recording start time.

When the user depresses the recording button, a control signal indicating the start of the recording is inputted from the user operation input unit 2745, and is received by the control signal transmitting/receiving unit 2733. The received control signal is temporarily stored in the memory 2749, and the CPU 2721 interprets the control signal and controls to start the recording operation.

Simultaneously, the CPU 2721 uses the OSD (On Screen Display) or the like to notify the user that the user's input has been normally accepted and the recording is started.

The CPU 2721 controls the multiplexing/separating unit 2729 to transfer the stream of the program which has been selected by the user and which the user has instructed to record, to the recording/reproducing unit 2727.

As shown in FIG. 28, for stream data inputted from the multiplexing/separating unit 2829, the recording/reproducing unit 2827 performs an encryption process such as the AES (Advanced Encryption System) in the encrypting unit 2861, performs a packetization process in the packetizer 2863, and temporarily accumulates the processed stream data in the buffer 2864. Moreover, the pulse signal, which has been synchronized with the PCR of the stream inputted from the multiplexing/separating unit 2829, in the PLL 2860, is counted in the counter 2862, transferred to the packetizer 2863, and added to the transport packet as the arrival time clock of the TP extra header.

The packets accumulated in the buffer 2864 are recorded on the primary recording medium 2826 such as a DVD or a Blu-ray Disc™ by the storage I/F 2865. At this time, the image stream and the sound stream are recorded as the m2ts files in the file structure as shown in FIG. 1.

For example, a name of the stream file becomes "01000.m2ts".

Furthermore, when the recording is completed, the clip information file, the real playlist file, the info.bdav file and the like are recorded on the primary recording medium 2826.

For example, the clip information file becomes "01000.clpi", and the real playlist file becomes "01001.rpls".

A recording start time and a recording end time of the stream file 146 are recorded in the IN time 606 and the OUT time 607 of the clip information file "01000.clpi", respectively. "01000" is recorded in the clip information file name 602 of the real playlist file "01001.rpls".

If only one clip is recorded, "1" is recorded in the number of playitems 503.

In a mode for directly recording the image stream or the sound stream included in the broadcast wave, as described above, the stream is directly transferred from the multiplexing/separating unit 2729 to the recording/reproducing unit 2727 in FIG. 27. However, in a case of converting the stream into a format such as H.264 or Dolby Digital™ and recording the converted stream, the stream is transferred from the multiplexing/separating unit 2729 to the image decoding/converting unit 2730, accumulated in the buffer 2995 via the switching unit 2980 within the image decoding/converting unit 2730 as shown in FIG. 29, applied with the format conversion by the transcoder 2996, and returned to the multiplexing/separating unit 2729 of FIG. 27 further via the buffer 2995 and the switching unit 2980. The returned stream data is transferred to the recording/reproducing unit 2727, and recorded on the primary recording medium 2726, similarly to the above description.

In addition to the recording of the broadcast wave, content downloaded from the network may also be recorded on the primary recording medium 2726 or the secondary recording medium 2750.

In a case where the recording/reproducing apparatus is connected to the network 2755 outside the apparatus, via the network terminal 2756, if a program (for example, a JAVA® program) included in the primary recording medium 2726 is loaded, the CPU 2721 executes the program, and the program has been described to access the network, then it is possible to connect to a web site designated in the program and download new content.

The downloaded content is transferred to the recording/reproducing unit 2727 via the network I/F 2725, and is recorded on the secondary recording medium 2750.

Moreover, according to the digital I/F 2746, digital data may also be inputted via the digital input/output 2757, and recorded on the primary recording medium 2726 or the secondary recording medium 2750.

If the digital input/output 2757 of the recording/reproducing apparatus is a USB (Universal Serial Bus) or IEEE 1394, it is possible to connect to a storage device including the same digital I/F, for example, a digital video camera, a digital still camera, an external HDD or a USB flash memory, to input digital data.

Alternatively, if the digital input/output 2757 is an SD card™ slot, it is possible to insert an SD card with content recorded thereon, into this slot, and thereby directly input digital data from the SD card.

For example, in a case of a video camera or a digital camera conforming to AVCHD™, the video camera or the digital camera can be USB-connected, and compressed digital data which has been recorded in the H.264 format can be inputted to this recording/reproducing apparatus from an internal HDD, a flash memory or an optical disc, and can be recorded on the primary recording medium 2726 or the secondary recording medium 2750.

It should be noted that, also if the application program on the ROM layer is executed to perform a recording process as in step 3005, a similar process is performed except that the CPU 2721 starts the recording operation according to a recording start instruction from the application program, instead of an instruction from the user operation input unit 2745.

Moreover, a channel selection process may be configured to be executed at any time in response to the user's request or the like.

Moreover, as another embodiment, it is also conceivable to distinguish the recorded programs from each other by the playlist files, instead of the BDAVn folders.

In other words, as shown in FIG. 38, the programs are recorded only in a BDAV folder 3802 under a root directory 3801, and in playlist files 3841 to 3856 under a PLAYLIST folder 3821, the playlist files 3841 to 3845 are assigned as the programs recorded by the application on the ROM layer, and the playlist files 3851 to 3856 are assigned as the programs recorded by the user.

At this time, for the playlist files 3841 to 3845 of the programs recorded by the application on the ROM layer, a value other than 0 is recorded in the hybrid flag 321, and the manufacturer ID and the model code of the application on the ROM layer are recorded in the manufacturer ID 310 and the model code 311. For the playlist files 3851 to 3856 of the programs recorded by the user, 0 is recorded in the hybrid flag 321, and the manufacturer ID and the model code of the recorder are recorded in the manufacturer ID 310 and the model code 311.

Furthermore, for the playlist files 3841 to 3845 of the programs recorded by the application on the ROM layer, a fixed value (in this case, 9) is allocated to a first character, such as 9xxxx.mpls, so that this character indicates the playlist file of the program recorded by the application on the ROM layer. For the playlist files 3851 to 3856 of the programs recorded by the user, a value other than 9 (in this case, y) is allocated to a first character, such as yxxxx.mpls, so that this character indicates the playlist file of the program recorded by the user.

It should be noted that when a serial number unique to each recorder is assigned to the model code of the recorder which records the program, the recorded programs can be distinguished from each other even if multiple recorders have recorded the programs on one hybrid disc.

Thereby, even if multiple users record the programs on one hybrid disc by using different individual recorders of the same model, the recorded programs can be distinguished from each other, and it is possible to avoid such a problem in that the users may freely delete the program recorded by another user.

Reproduction operations of the present embodiment will be described.

When an optical disc as the primary recording medium 2726 of FIG. 27 is loaded in the recording/reproducing unit 2727, insertion of the disc is notified by the recording/reproducing unit 2727, and the CPU 2721 instructs the recording/reproducing unit 2727 to access the disc, and executes recognition of the disc, confirmation of whether or not automatic reproduction is required, and the like.

Subsequently, a list of content recorded on the disc is read out, and the content list is displayed on the display connected to this recording/reproducing apparatus.

Figure 31:
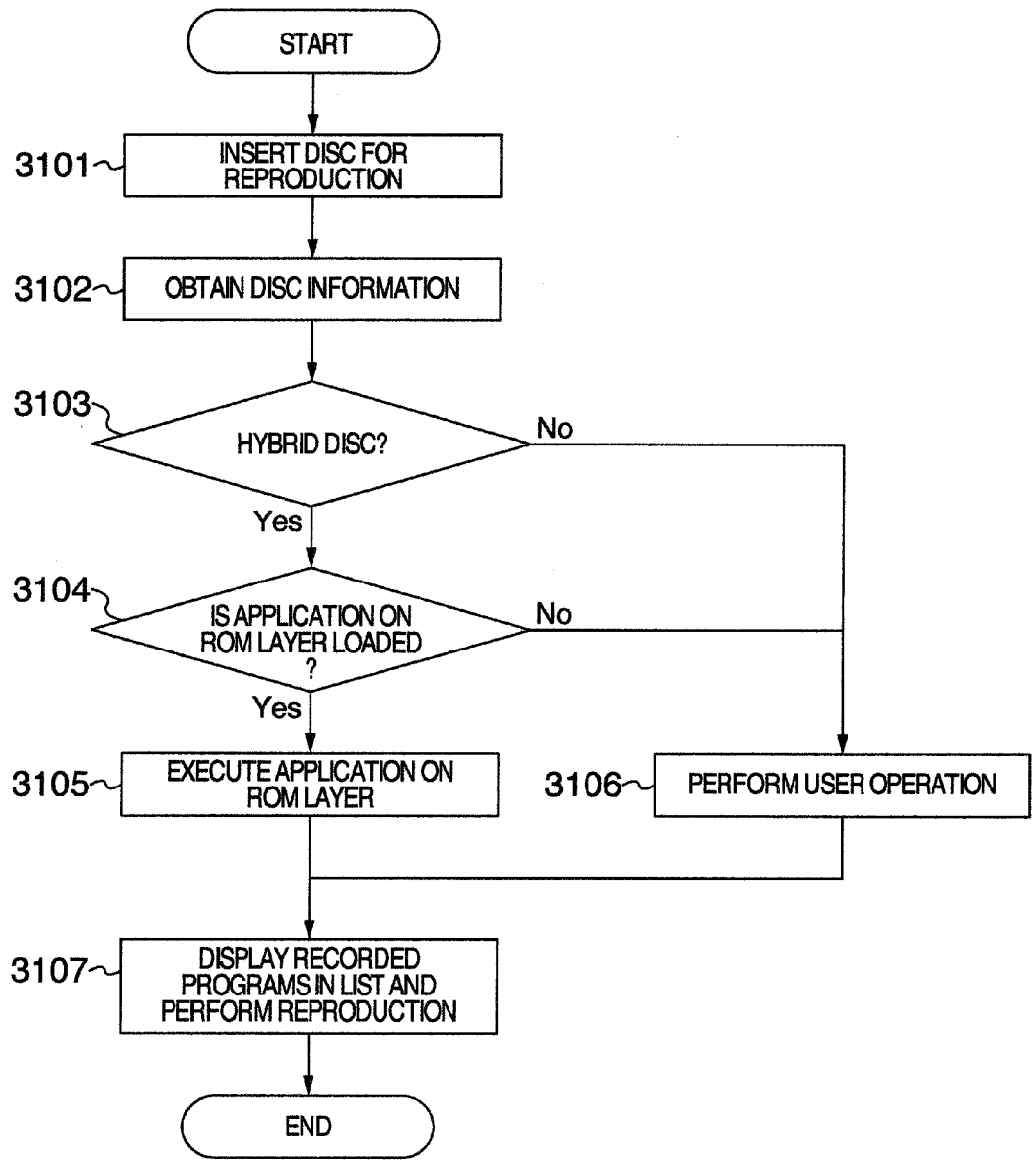
FIG. 31 is a flow diagram of a reproduction process.

FIG. 31 is a process flow diagram showing operations in a case of performing the reproduction from the RE layer of the hybrid disc.

When the hybrid disc is inserted into the recording/reproducing apparatus (step 3101), the recording/reproducing unit 2727 accesses the hybrid disc corresponding to the primary recording medium 2726, and obtains the disc information such as the medium class (step 3102).

The CPU 2721 analyzes the obtained disc information and determines whether or not the disc is the hybrid disc (step 3103). If it is determined that the disc is not the hybrid disc, the user performs a reproduction start process (step 3106). If it is determined that the disc is the hybrid disc, a message asking whether or not to load and execute the application recorded on the ROM layer is displayed on the OSD screen to ask the user to confirm it (step 3104). If the user selects to execute the application, the application program on the ROM layer is executed (step 3105). If the user does not select to execute the application, the user performs the reproduction start process (step 3106).

Figure 32:
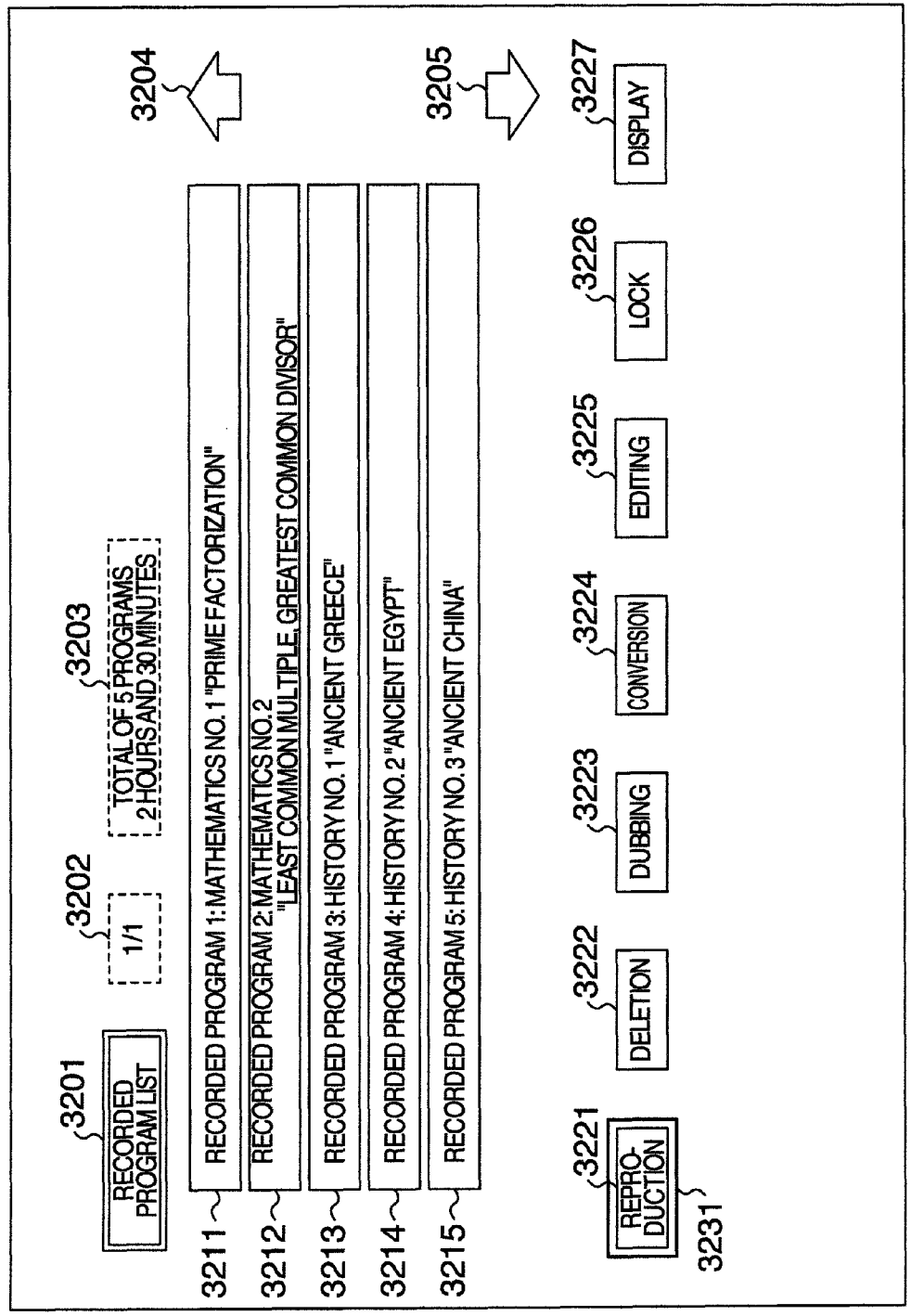
FIG. 32 is a schematic diagram of a list display screen for programs recorded by an application on a ROM layer.

In a case of step 3105, in the info.bdav files (for example, the info.bdav file 3511 and the info.bdav file 3513) recorded in the BDAV folder 3502 and the BDAVn folders (for example, the BDAV1 folder 3503 and the BDAV2 folder 3504) existing under the root directory 3501, an info.bdav file which has the hybrid flag 3602 of a value other than 0, and whose manufacturer ID and model code coincide with the manufacturer ID and the model code included in the application recorded on the ROM layer, is selected, and the programs in the subfolders under the BDAVn folder (for example, the BDAV folder 3502) including the selected info.bdav file are displayed in a list as shown in FIG. 32 (step 3107).

Figure 33:
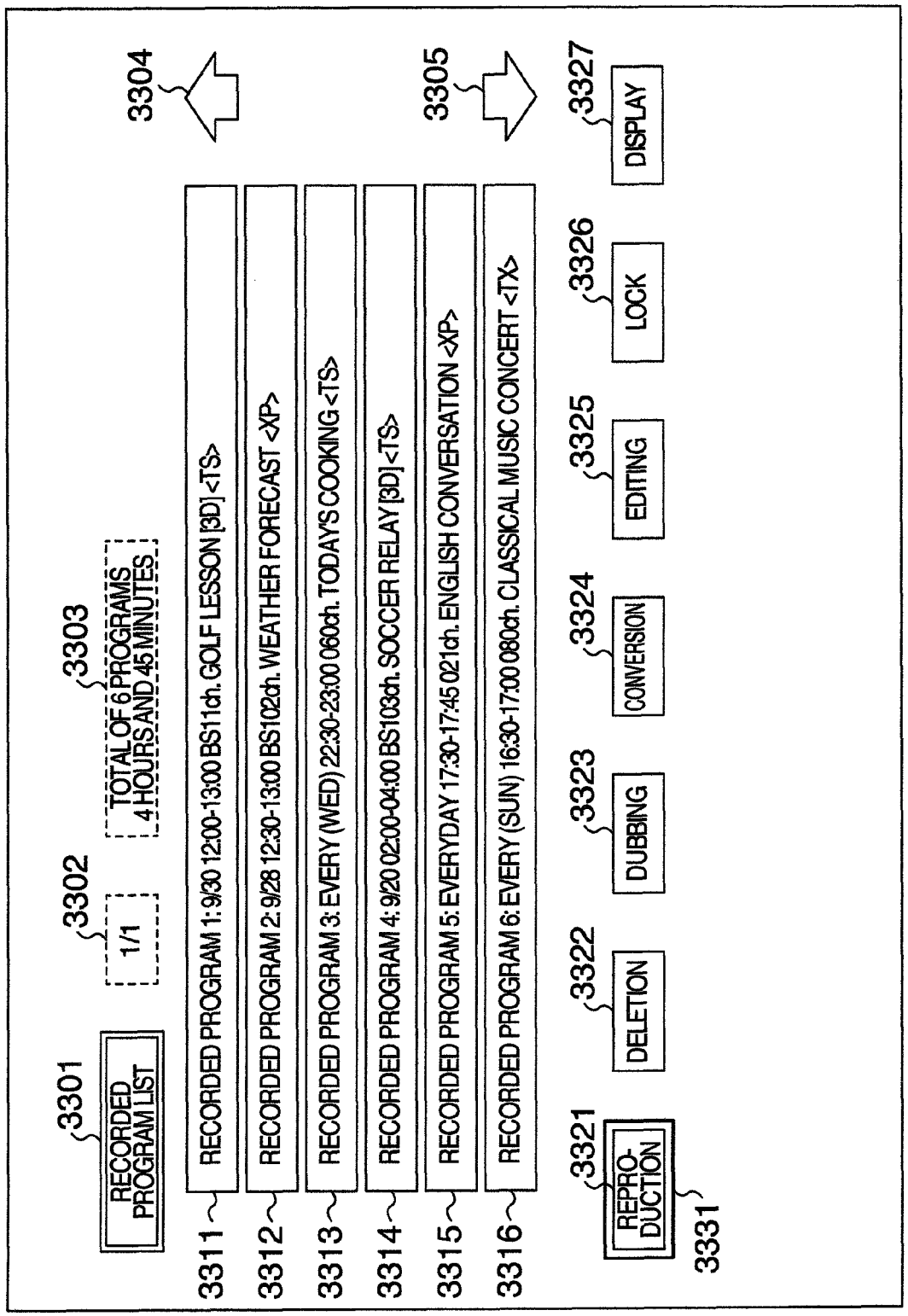
FIG. 33 is a schematic diagram of a list display screen for programs recorded by a user.

In a case of step 3106, in the info.bdav files (for example, the info.bdav file 3511 and the info.bdav file 3513) recorded in the BDAV folder 3502 and the BDAVn folders (for example, the BDAV1 folder 3503 and the BDAV2 folder 3504) existing under the root directory 3501, a file having the hybrid flag 3602 of 0 is selected, and the programs in the subfolders under the BDAVn folder (for example, the BDAV1 folder 3503) including the selected info.bdav file are displayed in a list as shown in FIG. 33 (step 3107).

FIG. 32 shows an example of the list of the content recorded by the ROM-layer application.

FIG. 32 is a schematic diagram of a list display screen for the programs recorded by the application program on the ROM layer, in the programs recorded on the RE layer of the hybrid disc.

The content displayed here is a list of the content recorded under the BDAV folder 3502.

Reference numeral 3201 denotes a title display section for this screen. This section indicates that the screen is the screen for displaying the recorded programs in the list.

Reference numeral 3202 denotes a page number display section. This section indicates that the recorded program list has a total of one page, in which a first page is displayed.

Reference numeral 3203 denotes a display section for the total number of pieces of the content and a total content recording time. In this case, this section indicates that a total of five programs are recorded, and a total time thereof is two hours and 30 minutes.

Reference numeral 3204 denotes a scroll up button. The recorded programs displayed in the list are scrolled up by performing an operation of using a cursor or the like to depress this button, in the user's operation on a remote control or the like.

Reference numeral 3205 denotes a scroll down button which performs an operation opposite to the scroll up button.

Reference numeral 3211 denotes an information display section for the recorded program 1. In this example, this section displays that a name of the program is "Mathematics No. 1 Prime Factorization".

Reference numeral 3212 denotes an information display section for the recorded program 2.

Reference numeral 3213 denotes an information display section for the recorded program 3.

Reference numeral 3214 denotes an information display section for the recorded program 4.

Reference numeral 3215 denotes an information display section for the recorded program 5.

Reference numeral 3216 denotes an information display section for the recorded program 6.

Reference numeral 3221 denotes a reproduction function menu list. When this menu list is selected, for example, only the programs regarding mathematics in the recorded programs can be consecutively reproduced.

Reference numeral 3231 denotes a selection frame which indicates a selected item when the user uses a user interface such as the remote control to select one item from items displayed on the screen. This case shows a state where "reproduction function" is selected.

Reference numeral 3222 denotes a deletion function menu list. In order to prohibit the user from directly deleting the content recorded by the ROM-layer application, without involving the ROM-layer application, and in order to avoid alteration of the content which is not supposed by the ROM-layer application, even if the user selects this menu list, a deletion operation is disabled, and a message indicating that the deletion is not allowed is displayed to the user.

Reference numeral 3223 denotes a dubbing function menu list. When this menu list is selected, for example, only the programs regarding mathematics in the recorded programs can be dubbed.

Reference numeral 3224 denotes a conversion function menu list. When this menu list is selected, for example, the program having a high bit rate in the recorded programs can be converted into a format with a low bit rate, which is suitable for reproduction in a portable device, and a copy can be generated.

Reference numeral 3225 denotes an editing function menu list. In order to prohibit the user from directly editing the content recorded by the ROM-layer application, without involving the ROM-layer application, and in order to avoid the alteration of the content which is not supposed by the ROM-layer application, even if the user selects this menu list, an editing operation is disabled, and a message indicating that the editing is not allowed is displayed to the user.

Reference numeral 3227 denotes a display function menu list. When this menu list is selected, for example, only the programs regarding mathematics in the recorded programs can be displayed in the list.

FIG. 33 shows an example of the list of the content recorded by the user.

FIG. 33 is a schematic diagram of a list display screen for the programs recorded by the user, in the programs recorded on the RE layer of the hybrid disc.

The content displayed here is a list of the content recorded under the BDAV1 folder 3503.

Reference numeral 3301 denotes a title display section for this screen. This section indicates that the screen is the screen for displaying the recorded programs in the list.

Reference numeral 3302 denotes a page number display section. This section indicates that the recorded program list has a total of one page, in which a first page is displayed.

Reference numeral 3303 denotes a display section for the total number of pieces of the content and a total content recording time. In this case, this section indicates that a total of six programs are recorded, and a total time thereof is four hours and 45 minutes.

Reference numeral 3304 denotes a scroll up button. The recorded programs displayed in the list are scrolled up by performing the operation of using the cursor or the like to depress this button, in the user's operation on the remote control or the like.

Reference numeral 3305 denotes a scroll down button which performs the operation opposite to the scroll up button.

Reference numeral 3311 denotes an information display section for the recorded program 1. In this example, this section displays that the date and time of the recording is from 12 o'clock to 13 o'clock on September 30, a broadcast channel is BS11 channel, the program name is "Golf Lesson", the program has 3D content, and a recording mode is a TS mode.

Reference numeral 3312 denotes an information display section for the recorded program 2.

Reference numeral 3313 denotes an information display section for the recorded program 3.

Reference numeral 3314 denotes an information display section for the recorded program 4.

Reference numeral 3315 denotes an information display section for the recorded program 5.

Reference numeral 3316 denotes an information display section for the recorded program 6.

Reference numeral 3321 denotes a reproduction function menu list. When this menu list is selected, for example, only the program of "Golf Lesson" in the recorded programs can be consecutively reproduced.

Reference numeral 3331 denotes a selection frame which indicates the selected item when the user uses the user interface such as the remote control to select one item from the items displayed on the screen. This case shows the state where "reproduction function" is selected.

Reference numeral 3322 denotes a deletion function menu list. When this menu list is selected, for example, only the program of "Golf Lesson" in the recorded programs can be deleted.

Reference numeral 3323 denotes a dubbing function menu list. When this menu list is selected, for example, only the program of "Golf Lesson" in the recorded programs can be dubbed.

Reference numeral 3324 denotes a conversion function menu list. When this menu list is selected, for example, the program having the high bit rate in the recorded programs can be converted into the format with the low bit rate, which is suitable for the reproduction in the portable device, and the copy can be generated.

Reference numeral 3325 denotes an editing function menu list. When this menu list is selected, for example, only the program of "Golf Lesson" in the recorded programs can be edited.

Reference numeral 3327 denotes a display function menu list. When this menu list is selected, for example, only the program of "Golf Lesson" in the recorded programs can be displayed in the list.

From the recorded program 3311 to the recorded program 3316 displayed in FIG. 33, a target program is selected by the remote control or the like, "reproduction function" is selected, and the reproduction is started.

Alternatively, when the disc is inserted into the recording/reproducing apparatus, it is also possible to execute first play or to perform automatic reproduction such as resume play for resuming the reproduction from a position where previous reproduction has been ended.

The resume play can be realized in a manner that, when the disc is ejected, the recording/reproducing apparatus retains resume point list information including a pair of an ID of the disc and a last reproduction position, in a nonvolatile memory within the apparatus, and when the disc is inserted, at a time point when the disc ID of the inserted disc is recognized, the resume point list is referred to, and if there is a matched disc ID, the last reproduction position corresponding to the matched disc ID is determined as a reproduction resume position, and the reproduction is started after jumping to the position.

Alternatively, the resume play can be realized in a manner that the file name of the playlist for which the resume play is desired to be performed is previously registered in a resumed playlist file name of the info.bdav file 111, and thereby, when the disc is inserted, the info.bdav file 111 is read out, and the playlist file recorded in the resumed playlist file name is reproduced.

In addition to the first play and the resume play, a recorded program list display function included in the recording/reproducing apparatus can also be used so that the user can select a scene or the content desired to be reproduced, from a thumbnail list or the like displayed there.

For example, if the playlist file 141 (01001.rpls) of FIG. 1 is reproduced, first, the playlist information start address 203 in the structure of the playlist file of FIG. 2 is read out, and an offset on the file in which the playlist information is stored is obtained. Next, the playlist information is read out from a position sought by the offset from the beginning of the playlist file, and thereby, the playlist information of FIG. 5 is obtained. In this structure, a playitem 505 has the structure of FIG. 6, and the clip information file name to be reproduced can be known with reference to the clip information file name 602. For example, if "01000" is recorded in the clip information file name 602, it can be known that the clip information file 144 (01000.clpi) and the stream file (01000.m2ts) need to be read out. Furthermore, with reference to the IN time 606 and the OUT time 607, the reproduction start position and the reproduction end position in the clip to be reproduced can be known. This is repeated for the same number of times as the number recorded in the number of playitems 503, and thereby, information indicating which portions of which clips should be reproduced in order can be obtained.

Moreover, as another embodiment, it is also conceivable to distinguish the recorded programs from each other by the playlist files, instead of the BDAVn folders.

In other words, as shown in FIG. 38, the programs are recorded only in the BDAV folder 3802 under the root directory 3801, and in the playlist files 3841 to 3856 under the PLAYLIST folder 3821, the playlist files 3841 to 3845 are assigned as the programs recorded by the application on the ROM layer, and the playlist files 3851 to 3856 are assigned as the programs recorded by the user.

At this time, in order to display the programs recorded by the application on the ROM layer in the list, only the playlist files in which a value other than 0 is recorded in the hybrid flag 321, and in which the same values as the manufacturer ID and the model code of the application on the ROM layer are recorded in the manufacturer ID 310 and the model code 311, are displayed in the list. In order to display the programs recorded by the user in the list, only the playlist files in which 0 is recorded in the hybrid flag 321, and in which the same values as the manufacturer ID and the model code of the recorder are recorded in the manufacturer ID 310 and the model code 311, are displayed in the list.

Furthermore, if the first character of the file name of the playlist file is a fixed value (in this case, 9), such as 9xxxx.mpls, it can be known that the program is the program recorded by the application on the ROM layer. If the first character of the file name of the playlist file is a value other than 9 (in this case, y), such as yxxxx.mpls, it can be known that the program is the program recorded by the user.

It should be noted that the present invention is not limited to the above described embodiments, and includes various variations. For example, the above described embodiments have been described in detail in order to describe the present invention in an easily understandable manner, and are not necessarily limited to the embodiments including all the configurations described above. Moreover, a part of the configuration of one embodiment can be replaced with the configuration of another embodiment. Moreover, the configuration of another embodiment can also be added to the configuration of one embodiment. Moreover, for a part of the configuration of each embodiment, another configuration can be added, deleted or replaced.

Moreover, a part or all of the above described respective configurations, functions, processing units, processing means and the like may be realized in hardware, for example, by designing them in an integrated circuit. Moreover, the above described respective configurations, functions and the like may be realized in software by a processor interpreting and executing programs for realizing the respective functions.

Information such as the programs, tables and files for realizing the respective functions can be placed in a recording device such as a memory, a hard disk or an SSD (Solid State Drive), or in a recording medium such as an IC card, an SD card or a DVD.

Moreover, control lines and information lines which are regarded as necessary for the description are shown, and all the control lines and the information lines in a product are not necessarily shown. Practically, it may be regarded that almost all the configurations are connected to one another.

Moreover, while a case of performing the reproduction from the primary recording medium 2726 has been shown, equivalent effects can also be obtained if the reproduction is performed from the secondary recording medium 2750.

As a method of controlling whether the recording medium for the recording and the reproduction is the primary recording medium 2726 or the secondary recording medium 2750, the control can be realized by describing the medium for recording each file, in the management file recorded on the primary recording medium 2726. Furthermore, the reproduction from both recording media can be realized without causing the user to be conscious of the reproduction from the secondary recording medium 2750, by recording link information in the management file on the primary recording medium 2726. The link information causes the file recorded on the secondary recording medium 2750 to appear to be recorded on the primary recording medium 2726 in a pseudo manner.

Moreover, while a case of one ROM layer and one RE layer has been described, the number of the ROM layers and the number of the RE layers are not limited thereto.

Moreover, in FIG. 32, a case has been shown where the programs recorded by the application program on the ROM layer, in the programs recorded on the RE layer of the hybrid disc, are displayed in the list. However, an embodiment is also possible in which the programs are not displayed in the list and not reproduced if there is no coincidence in the manufacturer ID and the model code.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording method of recording information on a recording medium including a reproduction-only data layer and a recording/reproduction data layer, the recording method comprising the steps of:
   recording management information indicating that a program on the reproduction-only data layer has performed recording, in a first playlist under a PLAYLIST directory on the recording/reproduction data layer by the program on the reproduction-only data layer; and
   recording management information indicating that a user has performed recording, in a second playlist under the PLAYLIST directory by the user,
   wherein a file name of the first playlist is a character string "abcde" representing a 5-digit integer A, a file name of the second playlist is a character string "vwxyz" representing a 5-digit integer Z, the 5-digit integer A is equal to or larger than a constant S, and the 5-digit integer Z is smaller than the constant S.

2. A recording apparatus for recording information on a recording medium including a reproduction-only data layer and a recording/reproduction data layer, the recording apparatus comprising:
   a recording unit configured to record management information indicating that a program on the reproduction-only data layer has performed recording in a first playlist under a PLAYLIST directory on the recording/reproduction data layer by the program on the reproduction-only data layer; and
   a recording unit configured to record management information indicating that a user has performed recording in a second playlist under the PLAYLIST directory by the user,
   wherein a file name of the first playlist is a character string "abcde" representing a 5-digit integer A, a file name of the second playlist is a character string "vwxyz" representing a 5-digit integer Z, the 5-digit integer A is equal to or larger than a constant S, and the 5-digit integer Z is smaller than the constant S.

3. A reproducing method of reproducing information from a recording medium including a reproduction-only data layer and a recording/reproduction data layer, the reproducing method comprising the steps of:
   reproducing management information indicating that a program on the reproduction-only data layer has performed recording, from a first playlist under a PLAYLIST directory on the recording/reproduction data layer by the program on the reproduction-only data layer; and
   reproducing management information indicating that a user has performed recording, from a second playlist under the PLAYLIST directory by the user,
   wherein a file name of the first playlist is a character string "abcde" representing a 5-digit integer A, a file name of the second playlist is a character string "vwxyz" representing a 5-digit integer Z, the 5-digit integer A is equal to or larger than a constant S, and the 5-digit integer Z is smaller than the constant S.

4. A reproducing apparatus for reproducing information from a recording medium including a reproduction-only data layer and a recording/reproduction data layer, the reproducing apparatus comprising:
   a reproducing unit configured to reproduce management information indicating that a program on the reproduction-only data layer has performed recording from a first playlist under a PLAYLIST directory on the recording/reproduction data layer by the program on the reproduction-only data layer; and
   a reproducing unit configured to reproduce management information indicating that a user has performed recording from a second playlist under the PLAYLIST directory by the user,
   wherein a file name of the first playlist is a character string "abcde" representing a 5-digit integer A, a file name of the second playlist is a character string "vwxyz" representing a 5-digit integer Z, the 5-digit integer A is equal to or larger than a constant S, and the 5-digit integer Z is smaller than the constant S.

5. A recording medium including a reproduction-only data layer and a recording/reproduction data layer, comprising:
   on the recording/reproduction data layer, a PLAYLIST directory, a first playlist having management information indicating that a program on the reproduction-only data layer has performed recording, and a second playlist having management information indicating that a user has performed recording, and
   wherein a file name of the first playlist is a character string "abcde" representing a 5-digit integer A, a file name of the second playlist is a character string "vwxyz" representing a 5-digit integer Z, the 5-digit integer A is equal to or larger than a constant S, and the 5-digit integer Z is smaller than the constant S.

* * * * *